(12) United States Patent
Black et al.

(10) Patent No.: US 9,346,472 B2
(45) Date of Patent: May 24, 2016

(54) RAIL ROAD FREIGHT CAR

(71) Applicant: National Steel Car Limited, Hamilton (CA)

(72) Inventors: Ken Black, Hamilton (CA); James Batchelor, Hamilton (CA); James W. Forbes, Campbellville (CA); Damon King Quan, Thornhill (CA)

(73) Assignee: National Steel Car Limited (CA)

( * ) Notice: Subject to any disclaimer, the term of this patent is extended or adjusted under 35 U.S.C. 154(b) by 273 days.

(21) Appl. No.: 14/025,262

(22) Filed: Sep. 12, 2013

(65) Prior Publication Data

US 2015/0068425 A1    Mar. 12, 2015

(51) Int. Cl.
| | |
|---|---|
| *B61D 9/00* | (2006.01) |
| *B61D 3/16* | (2006.01) |
| *B61D 17/04* | (2006.01) |
| *B61F 1/00* | (2006.01) |
| *B61F 1/14* | (2006.01) |

(52) U.S. Cl.
CPC .... *B61D 3/16* (2013.01); *B61D 17/04* (2013.01); *B61F 1/00* (2013.01); *B61F 1/14* (2013.01); *Y02T 30/34* (2013.01)

(58) Field of Classification Search
CPC .............. B61D 9/00; B61D 9/06; B61D 9/14; B61D 7/00; B61D 7/02; B61D 17/00; B61D 17/08; B61D 17/04; B61D 17/10
See application file for complete search history.

(56) References Cited

U.S. PATENT DOCUMENTS

| | | |
|---|---|---|
| 831,654 A | 9/1906 | Dodds |
| 1,803,449 A | 5/1931 | Wine |
| 1,834,264 A | 12/1931 | Wine |
| 1,962,717 A | 6/1934 | Kiesel, Jr. |
| 2,012,999 A | 9/1935 | Lamont |
| 2,072,996 A | 3/1937 | Wine |

(Continued)

FOREIGN PATENT DOCUMENTS

| | | |
|---|---|---|
| CA | 1082524 | 7/1980 |
| CN | 101486347 | 7/2009 |

OTHER PUBLICATIONS

Blodgett, Omer W., Rigid-Frame Knees (Elastic Design) in Design Welded Structures,James F. Lincoln Arc Welding Foundation, Jun. 1966., pp. 5.11-1 to 5.11-20.

(Continued)

*Primary Examiner* — Jason C Smith
(74) *Attorney, Agent, or Firm* — Hahn Loeser & Parks LLP

(57) ABSTRACT

A drop-center rail road freight car may have a gondola body for carrying lading, which may have end sections and a deep central section therebetween. The body may include a decking or floor structure, and longitudinally extending side beams bordering the floor structure. The car may have U-shaped bending-moment transmitting cross-bearers. The cross-bearers and side beam stiffeners may have inner and outer flange continuity such as to transmit a bending moment. The car may have stub sills. The stub sills may each have an inboard gooseneck that extends downward and inboard. The gooseneck may have a longitudinally extending portion that connects to the endmost cross-bearer of the central portion of the car. The main shear plate may lap the side sills, and may be bent downwardly to mate with the end margins of the side sheet lower portion to form a converging box-like truncated pyramidal structure.

33 Claims, 17 Drawing Sheets

(56) References Cited

U.S. PATENT DOCUMENTS

| | | | |
|---|---|---|---|
| 2,104,359 A | 1/1938 | Wine | |
| 2,146,221 A | 2/1939 | Mayer et al. | |
| 3,240,168 A | 3/1966 | Charles et al. | |
| 3,421,453 A | 1/1969 | Allen et al. | |
| 3,713,400 A * | 1/1973 | Teoli | B61D 9/00 105/406.1 |
| 3,814,028 A * | 6/1974 | Adler | B61D 17/10 105/422 |
| 3,866,545 A | 2/1975 | Heap | |
| 3,964,399 A | 6/1976 | Miller et al. | |
| RE30,388 E | 9/1980 | Mundinger et al. | |
| 4,236,459 A * | 12/1980 | Teoli | B61D 7/02 105/244 |
| 4,252,067 A | 2/1981 | Stark | |
| 4,254,714 A * | 3/1981 | Heap | B61D 7/00 105/364 |
| 4,331,083 A * | 5/1982 | Landregan | B61D 9/06 105/247 |
| 4,361,097 A * | 11/1982 | Jones | B61D 9/00 105/239 |
| 4,417,526 A | 11/1983 | Marulic et al. | |
| 4,633,787 A * | 1/1987 | Przybylinski | B61D 9/06 105/406.1 |
| 4,637,320 A | 1/1987 | Paton et al. | |
| 4,690,072 A | 9/1987 | Wille et al. | |
| 4,738,203 A | 4/1988 | Gielow et al. | |
| 4,771,705 A * | 9/1988 | Przybylinski | B61D 9/06 105/404 |
| 4,800,820 A | 1/1989 | Tomaka | |
| 4,840,127 A | 6/1989 | Tomaka | |
| 4,881,470 A * | 11/1989 | Yates | B61F 5/38 105/165 |
| 4,930,427 A | 6/1990 | Ritter et al. | |
| 5,070,793 A | 12/1991 | Kurtz et al. | |
| 5,178,074 A * | 1/1993 | Fetterman | B61D 7/02 105/355 |
| 5,181,474 A | 1/1993 | Miller | |
| 5,216,958 A * | 6/1993 | Kurtz | B61H 13/24 105/247 |
| 5,341,747 A * | 8/1994 | Fetterman | B61D 7/02 105/355 |
| 5,367,958 A * | 11/1994 | Weiss | B61F 1/02 105/406.1 |
| 5,373,792 A * | 12/1994 | Pileggi | B61D 17/04 105/406.1 |
| 5,443,016 A * | 8/1995 | Erickson | B61D 7/00 105/248 |
| 5,727,475 A * | 3/1998 | Kurtz | B61D 17/08 105/404 |
| 5,813,353 A * | 9/1998 | Sauter | B61F 1/02 105/406.1 |
| 6,138,581 A * | 10/2000 | Smith | B61D 17/04 105/406.1 |
| 6,148,735 A * | 11/2000 | Sauter | B61D 17/08 105/199.3 |
| 6,330,863 B1 * | 12/2001 | Lydic | B61D 7/00 105/355 |
| 6,431,085 B1 * | 8/2002 | Saxton | B61F 1/02 105/355 |
| 6,523,484 B2 * | 2/2003 | Saxton | B61F 1/02 105/404 |
| 6,601,522 B2 | 8/2003 | Roxby | |
| 6,962,114 B1 * | 11/2005 | Forbes | B61D 3/08 105/355 |
| 6,978,720 B2 | 12/2005 | Johnson | |
| 7,424,854 B2 * | 9/2008 | Forbes | B61D 3/08 105/355 |
| 7,434,519 B2 | 10/2008 | Forbes et al. | |
| 7,461,600 B2 | 12/2008 | Forbes et al. | |
| 7,559,284 B2 | 7/2009 | Forbes et al. | |
| 7,757,611 B2 | 7/2010 | Forbes et al. | |
| 7,780,021 B2 | 8/2010 | Forbes | |
| 7,784,411 B2 | 8/2010 | Forbes | |
| 8,596,203 B2 | 12/2013 | Forbes et al. | |
| 2007/0101895 A1 | 5/2007 | Forbes et al. | |
| 2007/0101896 A1 | 5/2007 | Forbes et al. | |
| 2007/0277696 A1 | 12/2007 | Forbes | |
| 2010/0006000 A1 | 1/2010 | Forbes et al. | |
| 2010/0011987 A1 * | 1/2010 | Forbes | B61F 1/12 105/406.1 |
| 2010/0101447 A1 * | 4/2010 | Nutt | B61D 17/00 105/406.1 |
| 2015/0068425 A1 * | 3/2015 | Black | B61D 9/06 105/406.1 |

OTHER PUBLICATIONS

1997 Car and Locomotive Cyclopedia of American Practices, 6th ed.m Simmons-Boardman, Omaha, Section 1, "Open Top Hoppers", pp. 46-69.

The Car and Locomotive Cyclopedia of American Practices, 6th ed., ("The 1997 Cyclopedia") 1997, Simmons-Boardman, Omaha, Section 1, "Gondolas", pp. 74-93.

* cited by examiner

RAIL ROAD FREIGHT CAR

FIELD OF THE INVENTION

This invention relates to the field of rail road freight cars.

BACKGROUND

In North American rail road history one of the more common types of freight car rolling stock has been the gondola car. Gondola cars have been used to transport many different kinds of freight, from bulk commodities to scrap steel. Traditionally, gondola cars have tended to have two relatively deep side beams. Typically, the side beams, the floor, and the end walls of the body of a gondola car define an open topped container, or receptacle, into which lading may be placed. Gondola cars may sometimes have a center sill of relatively modest size. The side beams may often be the dominant vertical load bearing members, and may tend, at their ends, to be mated to a laterally extending main bolster and shear plate. The side beams themselves have tended to be deep beams having a top chord, a side sill, and a vertical web extending between the top chord and side sill.

The top chord is, typically, a continuous chord member running substantially the full length of the car. The top chord defines the upper edge or upper margin of the side beam of the car. It performs the function of the upper flange of the side beam. Most typically the top chord may be a hollow section. While top chords in the form of I-beams and C-channels can, and have, been used, top chords are frequently formed of closed hollow sections, such as rectangular (or square) steel tubes. Most often, vertical lading in the gondola car may tend to cause the top chord to be placed in compression.

Similarly, a side sill may be, or may include, a bottom chord of the deep side beam. That is, the side sill may include a lengthwise running member that defines the lower bounding member of the side beam of the car. The lengthwise running member may run substantially the entire length of the side beam, and may function to define the lower flange of the side beam. That lengthwise member is sometimes called a side sill, and sometimes called a bottom chord, but in either case may tend to function as the lower flange of the side beam. The side sill terminology may be more commonly used where the longitudinally extending member links the ends of cross-bearers and cross-ties at the edge of a deck or floor. In use, under vertical load the bottom chord or side sill, as it may be called, is most typically in tension. A side sill or bottom chord member may typically tend to be of quite substantial cross-sectional area. It may have a cross-sectional area of a comparable order of magnitude to that of the top chord. It may not necessarily be of closed hollow section, but may, for example, have the form of a large angle iron. Under vertical loading, the top chord and bottom chord may tend to work in opposition to carry bending moments from the center of the car to the end sections, with the vertical side sheets of the car carrying shear between the top chord and the bottom chord.

SUMMARY OF THE INVENTION

In an aspect of the invention there is a rail road gondola car. It has a gondola car body carried by railroad car trucks for rolling motion in a lengthwise direction along rail road tracks. The gondola car body includes a drop-center portion located between the trucks. The drop-center portion has a floor structure and a wall structure standing upwardly of the floor structure. The floor structure and the wall structure define a lading receptacle. The drop center portion of the floor structure having at least one cross-wise oriented bending-moment-transmitting frame.

In a feature of that aspect of the invention, the car is a stub sill car. In another feature, the drop center portion of the car is free of a center sill. In yet another feature, the car has a stub center sill. The stub center sill has an inboard end that terminates at the drop-center portion. The inboard end has a gooseneck formed thereat. The gooseneck co-operates with the drop center portion.

In another aspect of the invention there is a drop-center railroad freight car. A gondola car body is mounted on trucks for rolling motion in a longitudinal direction along railroad tracks. The gondola car body has first and second end portions and a deeper central portion located longitudinally between the first and second end portions. The central portion has a floor and at least a first cross-member to which the floor is mounted. The first cross-member defines a spring. The spring has a middle portion and first and second ends. The first and second ends are upturned relative to the central portion. In a further feature, the cross-member has the form of an upwardly opening bow member. In another further feature, each of the end portions is joined to the central portion at a structural knee. In a still another further feature, the car has first and second stub center sills mounted at the first and second end sections respectively. In another feature, the freight car is free of a straight-through center sill. In still another feature, the freight car has first and second laterally spaced apart side sills, and the first and second ends of the cross-bearer extend upwardly toward the first and second side sills respectively.

In another aspect of the invention, there is a drop-center rail road freight car. It has a gondola car body mounted on trucks for rolling motion in a longitudinal direction along railroad tracks. The gondola car body has first and second end portions and a deeper central portion located longitudinally between the first and second end portions. The gondola car body is free of a straight-through center sill. The deeper central portion has a floor. The deeper central portion has at least a first cross-bearer to which the floor is mounted.

In a feature of that aspect of the invention, the cross-member has the form of an upwardly opening bow member. In another feature, each of the end portions is joined to the central portion at a structural knee. In a further feature, each of the end portions of the first cross-member extend upwardly and laterally outwardly on an incline corresponding to the underframe portion of AAR Plate C. In another feature, the gondola car body has first and second sidewalls running along opposite sides thereof. The first and second sidewalls have upstanding posts and top chords. The first cross-bearer is aligned with respective posts of the first and second sidewall whereby the posts and the first cross-bearer co-operate as a spring resistive to lateral deflection of the top chords.

In another feature, the car has first and second stub center sills mounted at the first and second end sections respectively. Alternately expressed, the freight car is free of a straight-through center sill. In another feature, the freight car has first and second laterally spaced apart side sills, and the first and second ends of the cross-bearer extend upwardly toward the first and second side sills respectively. In another feature, each of the first and second end sections have respective first and second stub center sills; and the first center sill has a downwardly inclined gooseneck. In another feature, the gooseneck of the first stub center sill terminates at an endmost cross-bearer of the central portion. In still another feature, the gooseneck of the first stub center sill meets the endmost cross-member at a structural knee.

In another aspect of the invention there is a drop-center rail road gondola car. It has a gondola body having first and second end sections and a drop-center middle section therebetween. The drop center middle section has at least a first cross-bearer, the first cross-bearer having a U-shape.

In another feature of that aspect of the invention the gondola body has first and second side sills, and the U-shaped cross-bearer has first and second upturned ends connected to the first and second side sills respectively. In another feature, the first cross-bearer has a low central portion, and first and second upwardly extending ends connected thereto. The first end portion is connected to the central portion at a first elbow. The second end portion being connected to the central portion at a second elbow. In a further feature, the first and second elbows are structural knees.

In another aspect of the invention, there is a drop-center rail road gondola car. It has first and second end sections, and a deeper central portion located length-wise between the first and second end sections. It has a floor, and a containment wall standing upwardly therefrom, the floor and containment wall defining a receptacle for lading, the containment wall including first and second walls extending length-wise along opposite side of the gondola car. Each of the end sections has a main shear web. The main shear web has a substantially horizontal first portion extending cross-wise between the first and second side walls. The main shear web has a lengthwise inboard second portion defining a main shear web extension. The second portion extends length-wise inboard and downward of the first portion. The second portion of the main shear web has margins mated with predominantly downwardly extending margins of the first and second side walls.

In a feature of that aspect of the invention, the first and second wall members have upper portions and lower portions. The lower portions are angled downwardly and cross-wise inwardly. The lower portions mate with the second portion of the main shear web to define a box end that converges both length-wise and cross-wise. In another feature, the gondola car has straight through side sills running lengthwise from end section to end section. The first portion of the main shear web mates with the side sills at a lap joint. The main shear web has a margin that deviates crosswise inboard of the lap joint to mate with the sidewalls downwardly of the side sills. In another feature, the second portion of the main shear web defines at least a portion of an intermediate bulkhead between one of the first and second end portions and the central portion of the gondola car. In another feature, the gondola car has a stub center sill mated to the main shear web. The stub center sill has a downwardly and lengthwise inboard extending member mated to the second portion of the main shear web. In yet another feature, the central portion of the gondola car has an endmost cross-bearer, and the stub center sill includes a member mated to the endmost cross-bearer. In still yet another feature, the first and second sidewalls of the gondola car have respective top chords and side sheets extending between the top chords and side sills. The first and second sidewalls have side posts mounted to the side sheets. The posts extend between the side sills and the top chords. Particular side posts are in bending-moment-transmitting connection with the endmost cross-bearer whereby a large spring is formed to resist lateral deflection of the side walls and top chords.

It may be understood that the various aspects and features may be mixed and matched as may be appropriate. It may also be understood that the foregoing is not intended to be an exhaustive listing of aspects and features of the invention. These and other aspects and features of the invention may be understood with reference to the description which follows, and with the aid of the illustrations of a number of examples.

BRIEF DESCRIPTION OF THE FIGURES

The description is accompanied by a set of illustrative Figures in which:

FIG. 1b shows a side, or elevation, view of the freight car of FIG. 1a;

FIG. 1c shows a top, or plan, view of the drop-center railroad freight car of FIG. 1a;

FIG. 1d shows a bottom view of the drop-center railroad freight car of FIG. 1a;

FIG. 1e shows an end view of the railroad freight car of FIG. 1a;

FIG. 1f shows a side, or elevation, cross-section taken along the longitudinal centerline of the drop-center railroad freight car of FIG. 1a;

FIG. 3a is an isometric underside view of a portion of the freight car of FIG. 1a;

FIG. 3c is an enlarged detail of a side sheet transition abreast of the view of FIG. 3a;

FIG. 4b shows a side, or elevation, view of the railroad freight car of FIG. 4a;

FIG. 4e is an enlarged detail of a cross-section of a cross-bearer to side post knee of the railroad freight car of FIG. 4a.

DETAILED DESCRIPTION

Figure 1A:
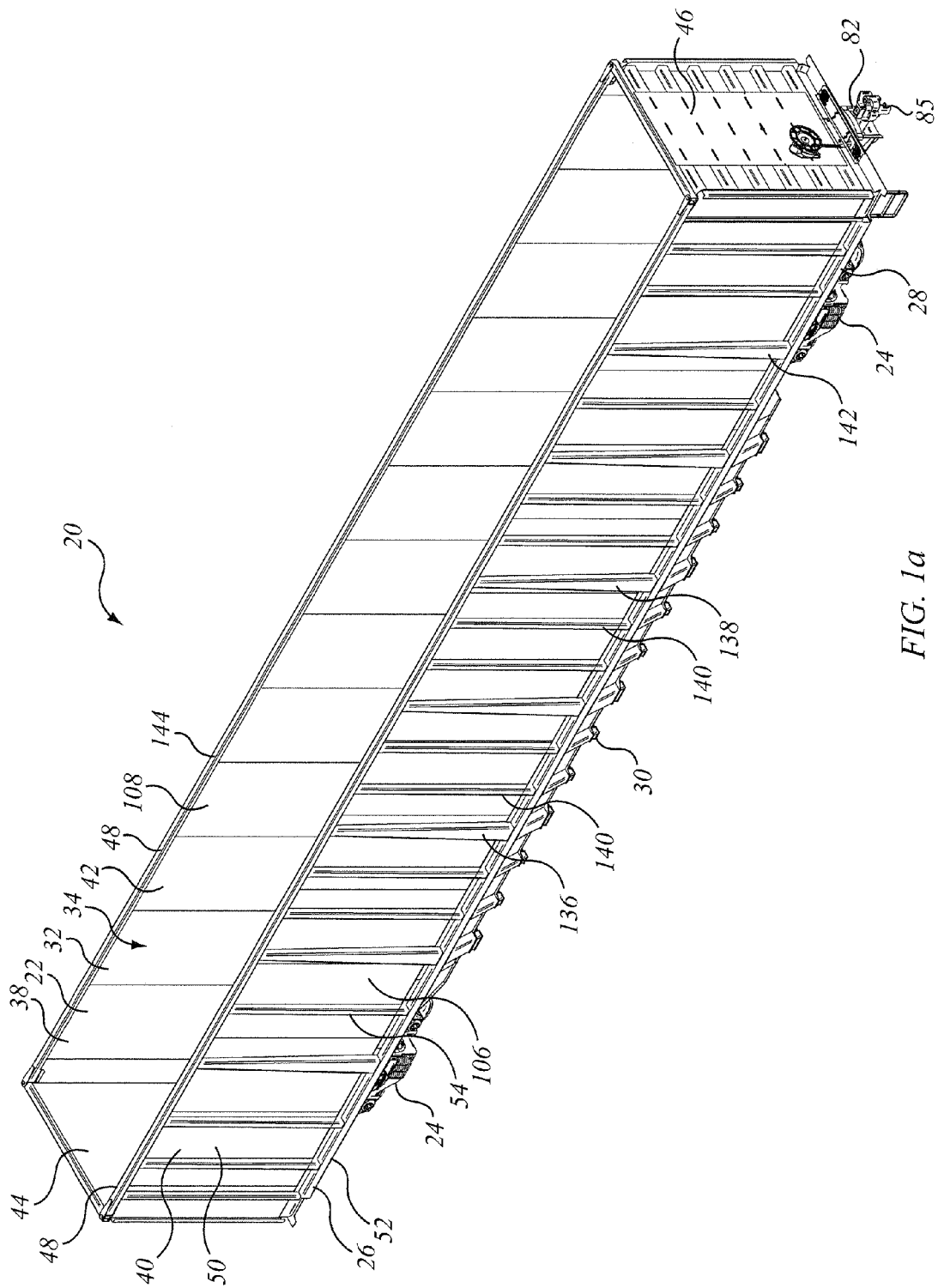
FIG. 1a is an isometric, general arrangement view of a drop-center railroad freight car.
Figure 1B:
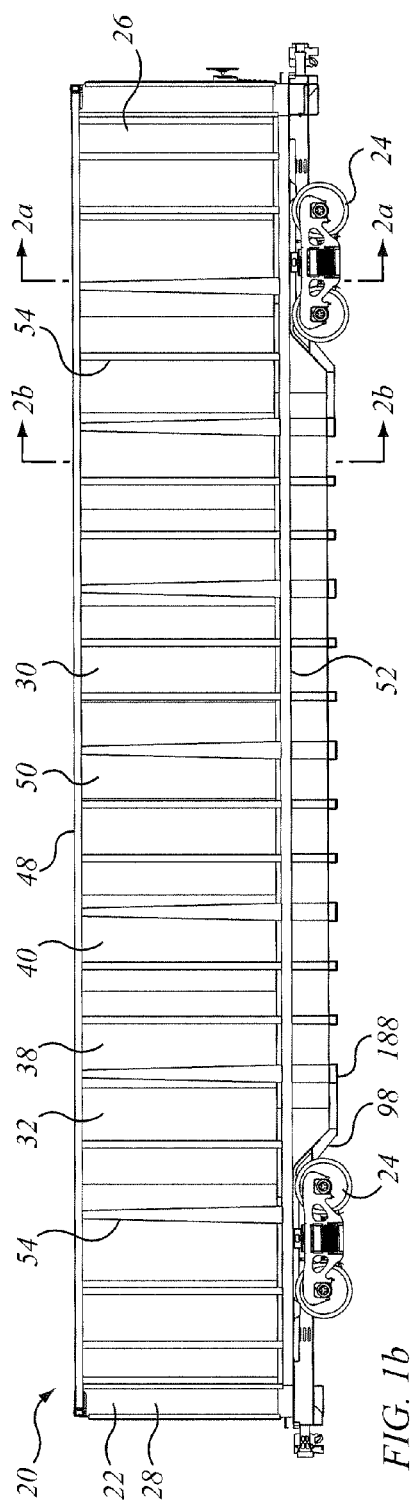
Figure 1C:
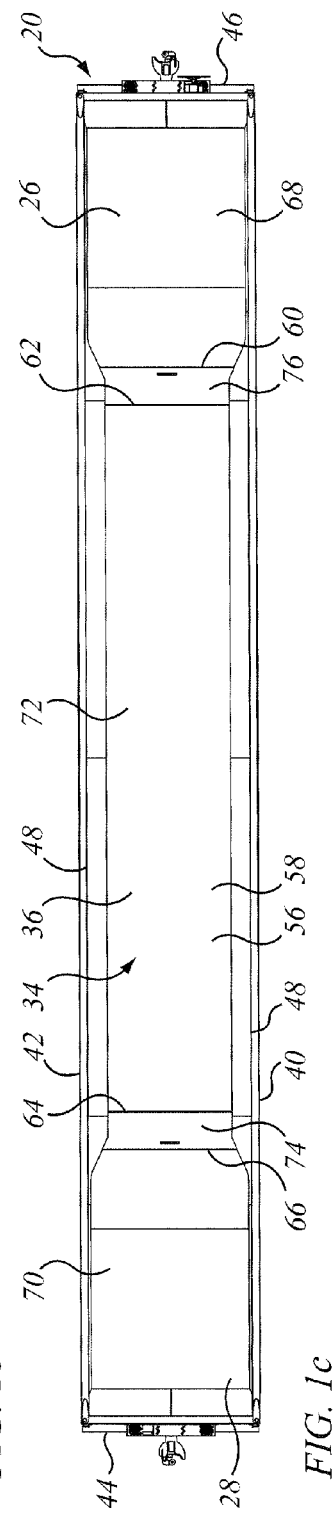

The description that follows, and the embodiments described therein, are provided by way of illustration of an example, or examples, of particular embodiments of the principles, aspects or features of the present invention. These examples are provided for the purposes of explanation, and not of limitation, of those principles and of the invention. In the description, like parts are marked throughout the specification and the drawings with the same respective reference numerals. The drawings may be taken as being to scale unless noted otherwise.

The terminology used in this specification is thought to be consistent with the customary and ordinary meanings of those terms as they would be understood by a person of ordinary skill in the rail road industry in North America. The Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record, (for example, earlier publications by persons not employed by the USPTO or any other Patent Office), demonstrating how the terms are used and understood by persons of ordinary skill in the art, or by way of expert evidence of a person or persons of at least 10 years' experience in the rail road industry in North America or in other former territories of the British Empire and Commonwealth.

In terms of general orientation and directional nomenclature, for rail road cars described herein the longitudinal or lengthwise direction is defined as being coincident with the rolling direction of the rail road car, or rail road car unit, when located on tangent (that is, straight) track. In the case of a rail road car having a center sill, be it a stub sill or a straight-through center sill, the longitudinal direction is parallel to the center sill, and parallel to the top chords and side sills, as may be. Unless otherwise noted, vertical, or upward and downward, are terms that use top of rail, TOR, as a datum. In the context of the car as a whole, the terms cross-wise, lateral, or laterally outboard, or transverse, or transversely outboard refer to a distance or orientation relative to the longitudinal centerline of the railroad car, or car unit, or of the centerline of a centerplate at a truck center. The term "longitudinally inboard", or "longitudinally outboard" is a distance taken relative to a mid-span lateral section of the car, or car unit. The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than". The directions correspond generally to a Cartesian frame of reference in which the x-direction is longitudinal, the y-direction is lateral, and the z-direction is vertical. Pitching motion is angular motion of a railcar unit about a horizontal axis perpendicular to the longitudinal direction. Yawing is angular motion about a vertical axis. Roll is angular motion about the longitudinal axis. Given that the rail road car described herein may tend to have both longitudinal and transverse axes of symmetry, a description of one half of the car may generally also be intended to describe the other half as well, allowing for differences between right hand and left hand parts. In this description, if used, the abbreviation kpsi stands for thousands of pounds per square inch. Also, it may be taken as a default that the structure of the car is of all-welded mild steel fabrication except as otherwise shown in the illustrations or indicated in the text. This need not necessarily be the case. Other materials, such as aluminum or stainless steel might be used.

In this discussion it may by understood that persons of ordinary skill in the art are familiar with the Rules and Standards of the Association of American Railroads (the AAR), which govern interchange service in North America. This specification or the accompanying illustrations may refer to standards of the Association of American Railroads (AAR), such as to AAR plate sizes. To the extent necessary or appropriate, those references are to be interpreted in a manner consistent with the Rules and Standards as extant on the earliest of the date of filing of this application or the date of priority of the earliest application from which this application claims priority, as if they formed part of this specification on that date.

FIG. 1a shows an isometric view from above and to one corner of an example of a rail road car 20 that is intended to be generically representative of a wide range of rail road cars, and in particular railroad freight cars in which the present invention may be incorporated. While car 20 may be suitable for many different uses, it may in one embodiment be a gondola car, which may be used for the carriage of bulk commodities. With the exception of brake fittings, safety appliances and other secondary fittings, car 20 is substantially symmetrical about both its longitudinal and transverse, or lateral, centreline axes. Consequently, where reference is made to a first or left hand side beam, or first or left hand bolster, it will be understood that the car has first and second, left and right hand side beams, bolsters and so on.

Rail road freight car 20 has a rail car body 22 and a pair of first and second trucks 24 upon which rail car body 22 is carried for rolling motion along railroad tracks in the manner of rail road cars generally. Rail road freight car 20 is a "drop-center" rail road car. That is, it has first and second end sections, 26, 28 each carried over a truck 24, and a medial or central portion 30 located longitudinally between end sections 26 and 28. Medial or central portion 30 is deeper than end portions 26 and 28, such that the lowermost portion of central portion 30 is lower than end sections 26 and 28.

Rail car body 22 may include a wall structure 32 defining a lading containment receptacle 34, in which lading may be carried. Wall structure 32 may include a base wall, which may be in the nature of a floor or flooring 36, and a generally upstanding peripheral wall 38 which may include a pair of first and second side walls 40, 42, and first and second end walls 44, 46. Flooring 36, sidewalls 40, 42 and first and second end walls 44, 46 may tend to define an open topped box, namely receptacle 34, into which lading may be introduced. Generally speaking, car 20 may be of all steel, or predominantly steel construction, although in some embodiments other materials such as aluminum or engineered polymers or composites may be used for some or a predominant portion of the containment receptacle structure. Side walls 40, 42 stand vertically, or predominantly vertically, upwardly from flooring 36. Inclined sheets or gussets 35 may be located at the junction of flooring 36 and end walls 44, 46, such as may protect the junction and facilitate unloading the car with a hydraulic shovel.

As illustrated in the embodiment of FIG. 1a, each of sidewalls 40, 42 may have a top chord 48, a side sheet, 50, and a side sill 52. Each side wall 40, 42 has an array of sidewall stiffeners 54, mated to side sheet 50, that extend between side sill 52 and top chord 48. In the embodiment illustrated, the main shear plate is carried at the level of, and defines, the top cover plate of the draft pocket (i.e., the top flange of the stub sill, as discussed below). The bottom flange of side sill 52 mates with the main shear plate. In the terminology defined herein, the "dropped center" is that portion of the car where the bottom of the containment receptacle lies, or extends, below the level of side sills 52, i.e., also below the level of the main shear plate of the respective end sections.

Flooring 32 may include a floor panel 56, which may be made of a plurality of floor sheets joined together, in an abutting fashion such as may yield a continuous lading containing surface, or, in one embodiment, may be made from a single, monolithic steel sheet 58. Steel sheet 56 may be a single sheet having its profile cut from a monolithic sheet of stock by a plasma arc cutting device, or cut at the steel mill. Use of a single sheet may simplify manufacture. In the case of drop center car 20, sheet 58 may, after being cut, be formed on a break or other bending tool to form bends as indicated at 60, 62, 64, and 66, such as to yield a first end portion 68, a second end portion 70, a central portion 72, and first and second transition portions 74 and 76, transition portion 74 being located between, and adjoining, first end portion 68 and central portion 72; transition portion 76 being located between, and adjoining, second end portion 70 and central portion 72. As bent or otherwise formed, central portion 72 and end portions 68 and 70 may tend to lie in substantially horizontal planes, central portion 72 being stepped downwardly from end portions 68 and 70; and transition portions 74 and 76 running through the respective height change regions of the upward step. Transition portions 74 and 76 may also be termed bulkheads. In the example illustrated, they are intermediate bulkheads (i.e., their location is intermediate the ends of the car) and they may be sloped bulkheads. Alternatively, floor panel 56 may not be entirely of one sheet, but may be predominantly of one sheet, such that, by area, more than half of floor panel 56 is cut from a single monolithic piece of stock. In another embodiment more than $1/4$ of floor panel 56 is cut from a single piece of monolithic stock. In another embodiment more than $3/4$ of floor panel 56 may be cut from a single monolithic piece of stock, such as rolled sheet or plate. Floor panel 56 may be between $1/4$ and $3/4$ inch thick steel plate, and may, in one embodiment be between $5/16$ and $1/2$ inches thick, and, one embodiment may be about $7/16"$ thick, and may provide a uniform common flange thickness above the center sill, cross-bearings, cross-ties and underneath the side beam web. Alternatively, each of portions 68, 70, 72, 74 and 76 may be separate pieces, being welded together on assembly, or, alternatively, portions 68 and 74 may be formed as a single piece with a radiused bend as at 60, and portions 70 and 76 may be formed as a single piece with a radiused bend as at 66.

Each of end sections 26 of body 22 of car 20 may include an underframe member such as a longitudinally running stub center sill, or simply a "stub sill" 80. A stub sill is a sill that runs only part of the length of the car inboard from the striker 82, and is to be contrasted with a "straight-through" center sill which runs the full length of the car from striker to striker. Stub sill 80 may have a draft sill, or draft sill portion 84 at the longitudinally outboard end thereof, into which draft gear fittings and releasable couplers 85 may be mounted. Respective stub sills 80 may be fabricated by welding a pair of spaced apart webs 86, 88 to the underside of portions 68 and 70 of floor panel 56. Stub sill 80 may have a bottom flange member 90, such as may be in the nature of a bottom or lower cover plate 92, welded across the bottom edges of webs 86, 88. Stub sill 80 may also include internal web separators.

Generally speaking, a center sill may tend to have a distinct top flange, a bottom flange, and two webs extending between, and carrying vertical shear between, the top and bottom flanges. Gondola cars have tended to have had underframes that included a center sill, side sills, and cross-bearers and cross-ties extending between the center sill and side sills. Not infrequently, the cars have also had longitudinally running stringers at spaced intervals between the side sills and the center sill, carried by the cross-bearers and cross-ties. Some gondola cars had floors of wooden timbers, or planks, laid side by side over the stringers and over the center sill. In such a car, analysis of the resistance to vertical bending of the car might well have tended not to have attributed any strength to the wooden floor members.

In rail road freight car 20, stub sill 80 has a distinct bottom flange 90, and vertical webs 86, 88. Stub sill 80 also has a top flange, that top flange being a central region 94 of floor panel portion 68 that is influenced by the presence of webs 86, 88. That region of influence may extend between webs 86, 88 and a distance laterally outboard from each of them to yield an "effective width". That effective width may be equivalent to roughly 40 to 60 times the thickness of panel 56 plus the distance between the webs. The effective width distance may sometimes be estimated as being about 44-48 times the thickness. In one embodiment, panel 56 may be abnormally thick for a floor sheet. That is, floor panel 56 may be more than $5/16$ inches thick, and may be more than $3/8$ inches thick. In one embodiment floor panel 56 may be about $7/16$ inches thick, such that the effective width of top flange region 94 may extend roughly 8-12 inches (e.g., about $10\frac{1}{2}$ inches) outboard of webs 86, 88. Inasmuch as webs 86, 88 are welded directly to the underside of floor panel 44, there is a direct path for shear flow to pass between them, in contrast to arrangements in which the center sill has a top flange, and the floor sheets are then mounted above, and in addition to, that top flange such that shear flow from the webs cannot pass directly into the floor sheet but most flow via the intermediate medium of the center sill top flange. By contrast, in one embodiment of car 20, in vertical bending a predominant portion of the shear flow from webs 86, 88, (indeed, all of it), flows directly to and from floor panel 56 across the weld interface between the upper marginal edges of webs 86, 88 and the underside of floor panel 56. In this embodiment there is no other flange or cap plate, or doubler plate exchanging shear flow with webs 86, 88.

Longitudinally inboard of the draft sill is the truck center, at which there is a center plate 96 such as may seat within a mating center plate bowl of a truck, such as truck 24. Longitudinally inboard of the truck center, stub sill 50 may have a downwardly depending goose-neck 98.

Rail road car 20 may also include an array of supports or reinforcements 100 that run cross-wise between side beams 106, 108. That array includes an array of cross-bearers 102 and may include an array of cross-ties 104. Car 20 may include longitudinally extending first and second side beams 106, 108. Those side beams may define part or all of side walls 36, 38, and may be the dominant structural assemblies of car 20 in terms of resistance to vertical bending. They may be aided in that resistance by the co-operative adjoining effective flange width region of the floor panel. Each cross-bearer 102 extends across the full width of the car between side beams 106 and 108. Each cross-bearer has a moment connection at both ends to respective side beams 106 and 108. Each cross-tie 104 extends between side beams 106, 108. Expressed somewhat differently, the ability of the connection at the junction cross-tie and the sidewall stiffener to carry a moment may be smaller than, if not much smaller than, the ability of the junction between a cross-bearer and the corresponding sidewall stiffener to carry a moment. The difference may be greater than an order of magnitude, such that, for the purposes of this description the cross-tie junction may be considered not to pass, and not to be relied upon to pass, a moment from the side beam stiffener to the cross-tie. Car 20 may also have main bolsters 110 that extend laterally from stub sill 80 to side beams 106, 108, at the locations of the truck centers (CL Truck).

Figure 1D:
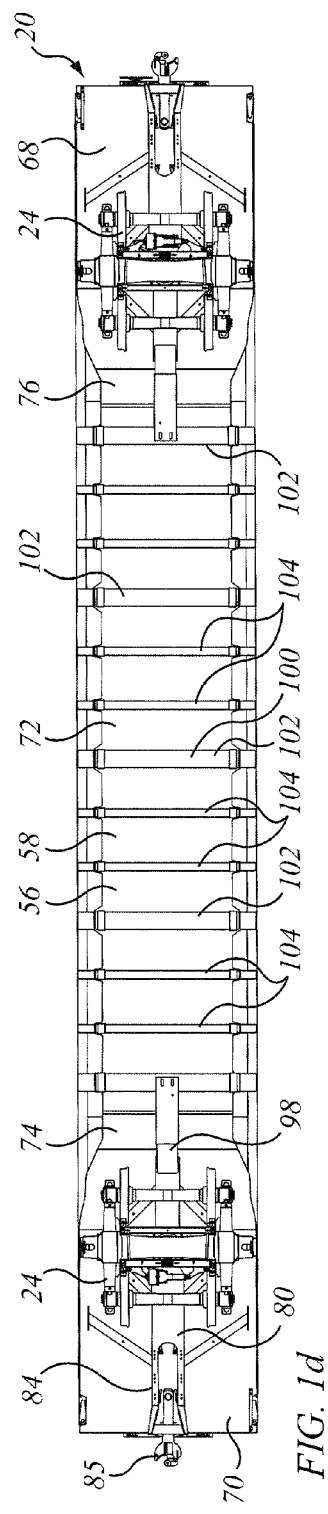
Figure 1E:
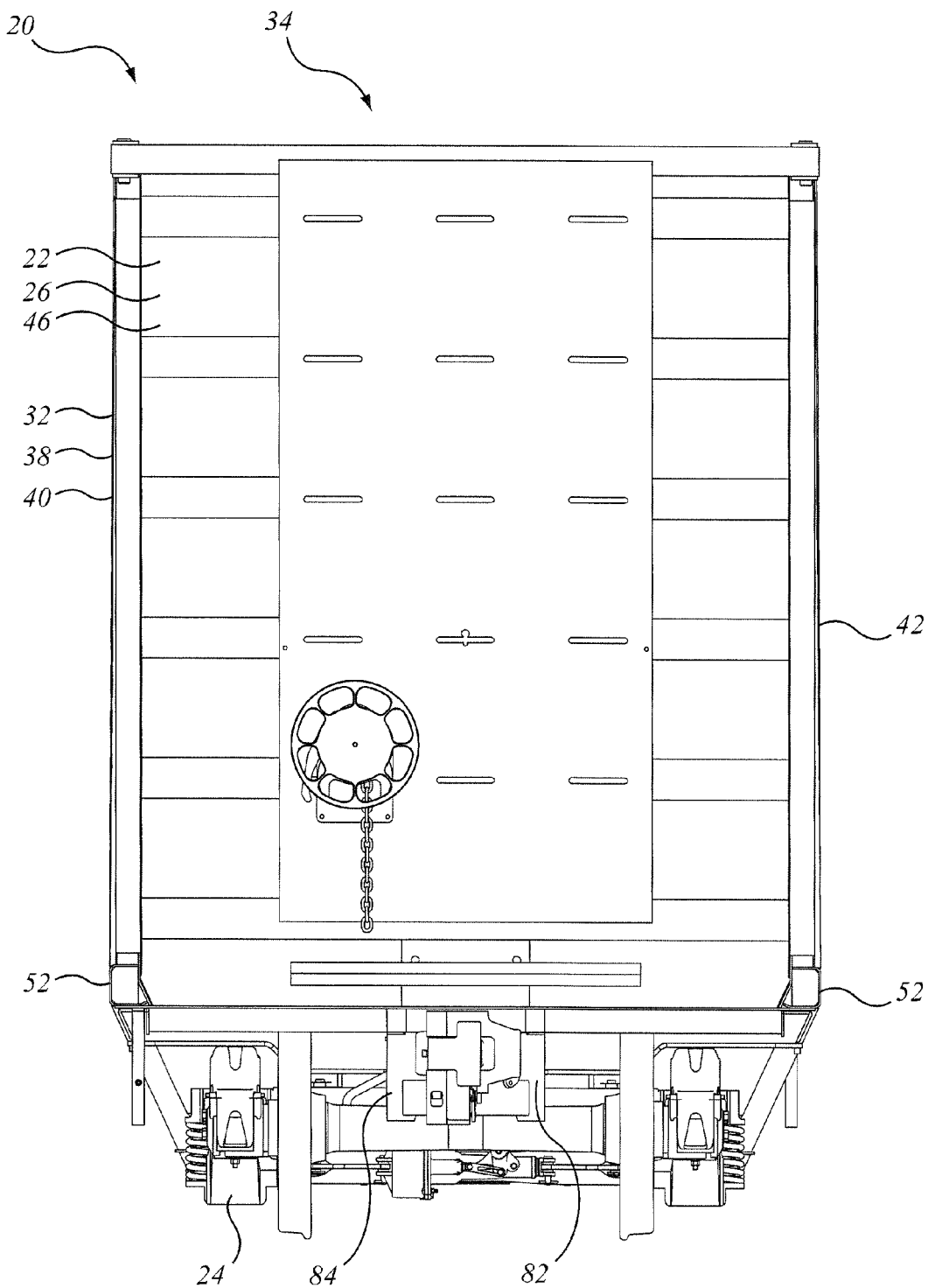
Figure 1F:
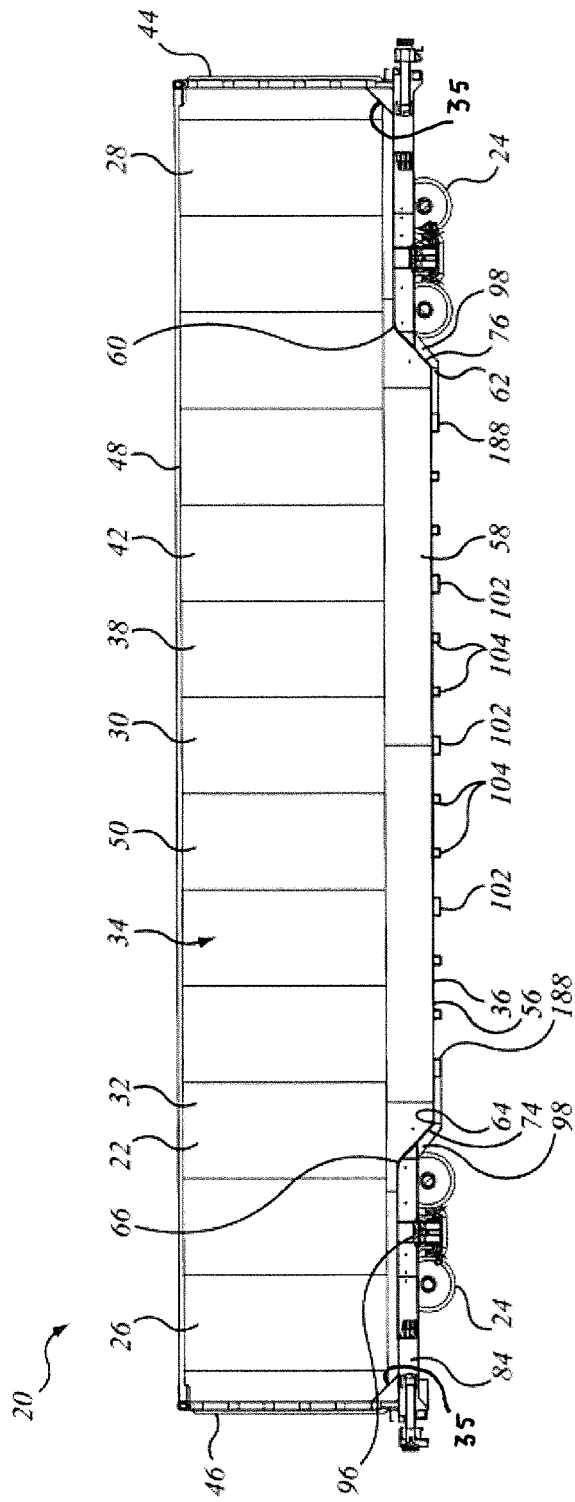
Figure 2A:
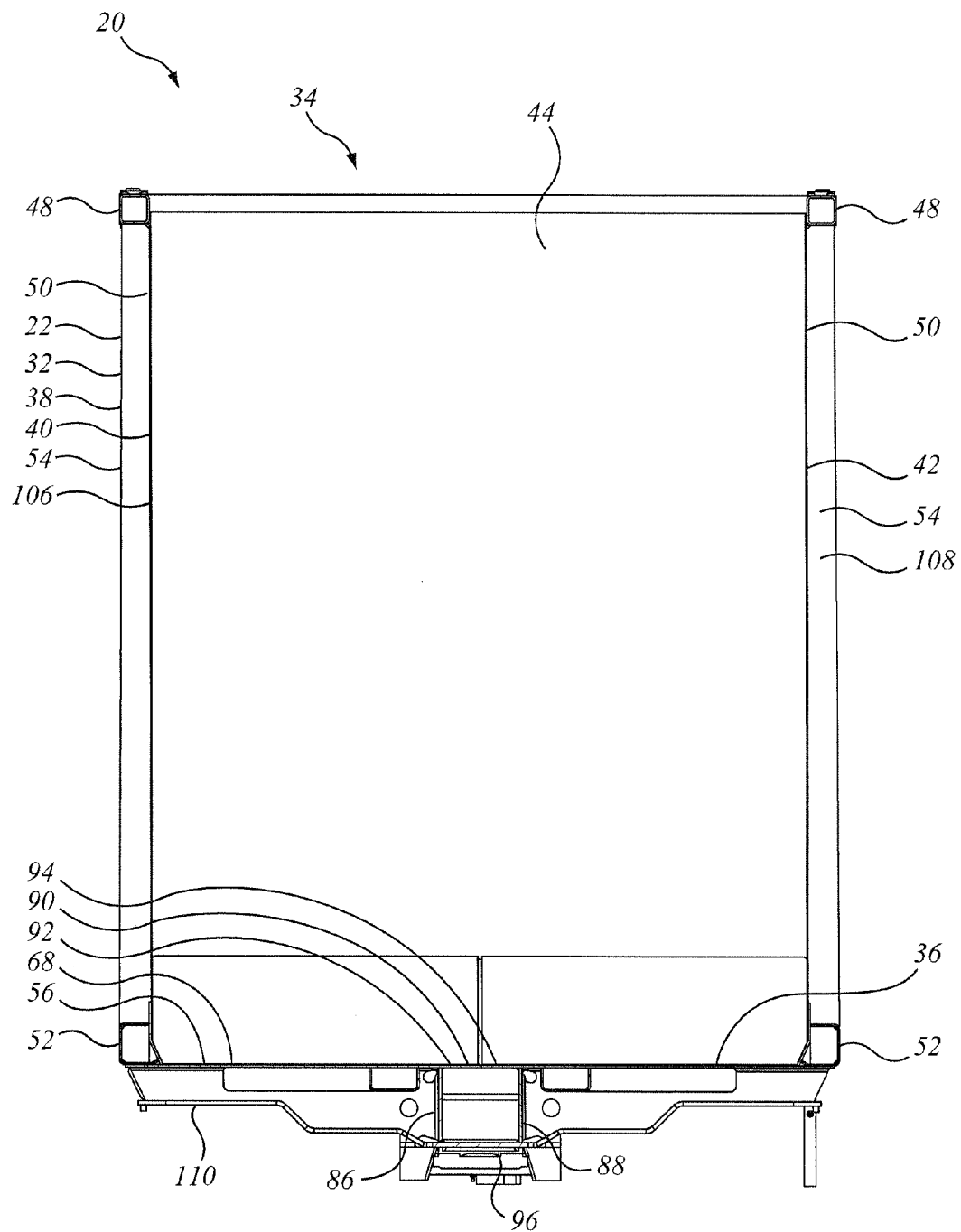
FIG. 2a is a view, in elevation, on section '2a-2a' of the freight car of FIG. 1b looking longitudinally outboard toward the main bolster with the truck removed.
Figure 2B:
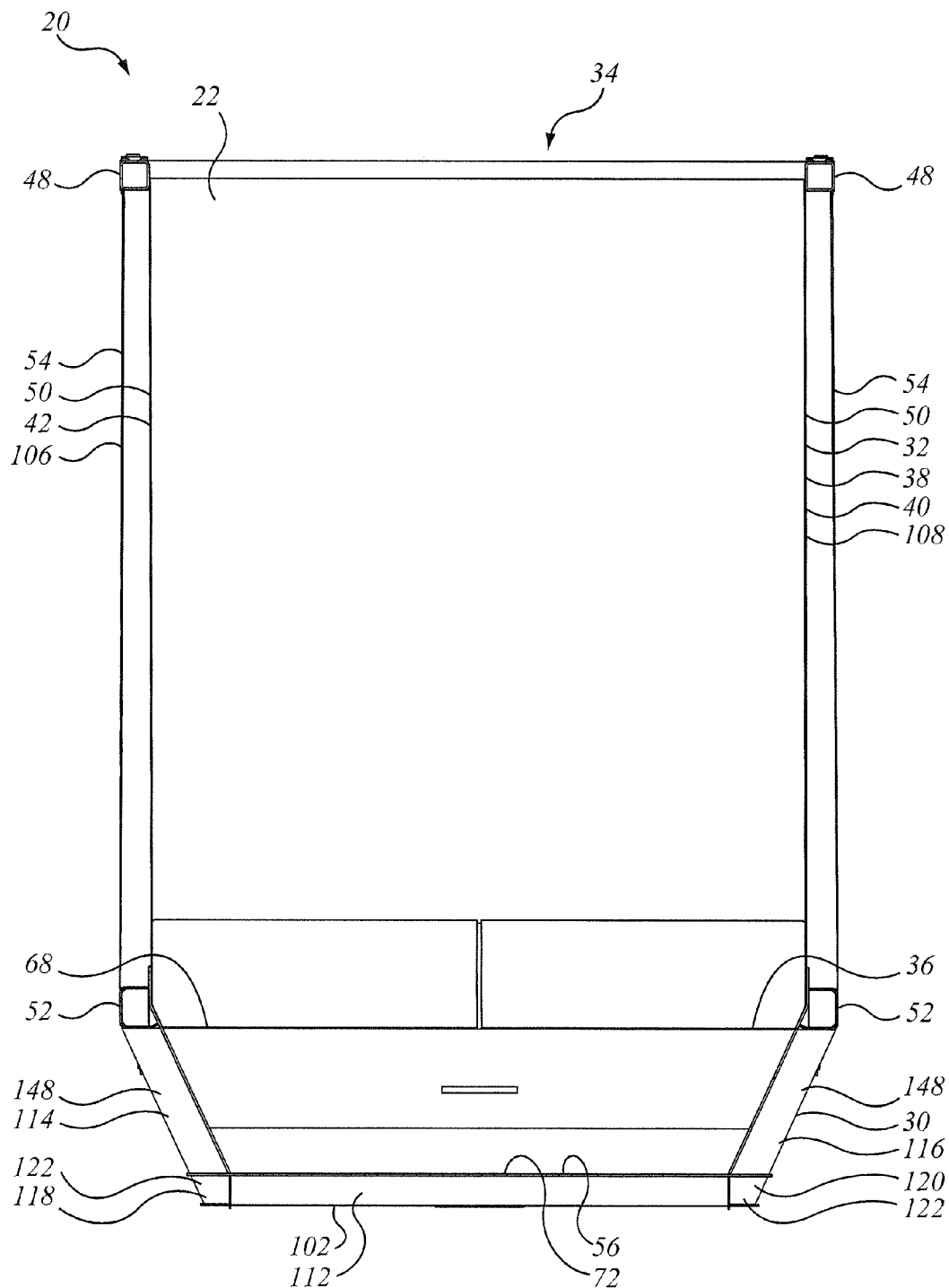
FIG. 2b is a cross-sectional view, in elevation, on section '2b-2b' of the railroad freight car of FIG. 1c looking toward a cross-bearer.
Figure 2C:
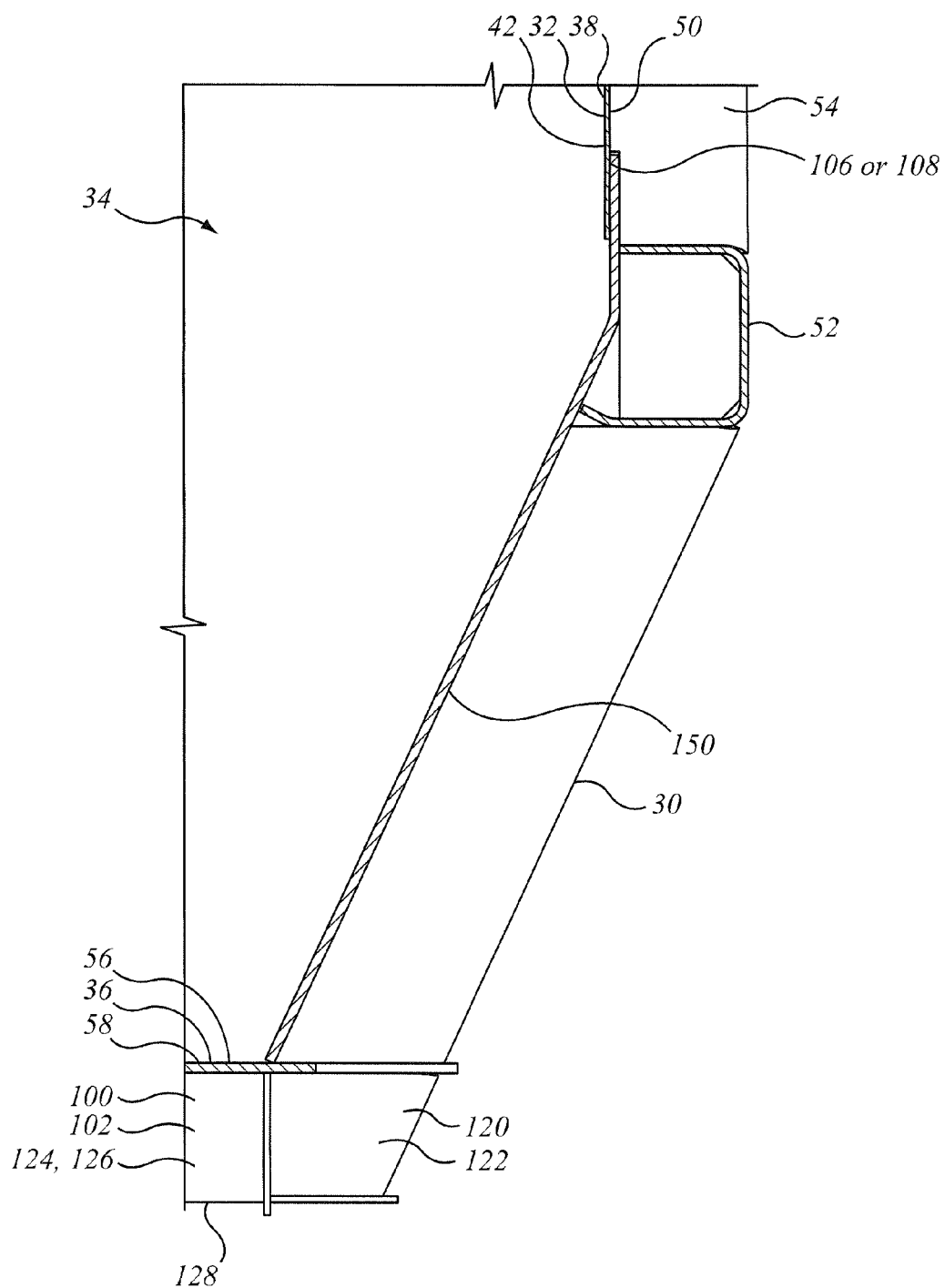
FIG. 2c is an enlarged detail of a cross-section of a cross-member of the railroad freight car of FIG. 2b.

Considering the embodiment of FIG. 1*d*, et seq., each cross-bearer 102 may have the form of a beam mated to, or co-operating with, the floor panel. Each cross-bearer 102 may be generally U-shaped, or have the form of a U-frame, when viewed looking in the x-direction along the car. The U shape may include a low central portion 112, and upwardly extending end portions 114, 116, such that cross-bearer 102 may have the form of an upwardly opening U-shaped frame or bow. Central portion 112 may meet, and join, end portions 114, 116 at respective knees 118, 120. Central portion 112 may be straight and horizontal. End portions 114, 116 may be straight and inclined on an angle, such as that corresponding to the angle of the AAR Plate C underframe profile. That is, at the joint or corner, there is a shear web 122 (or parallel, spaced-apart webs, as may be) that is surrounded about its periphery by the two flanges of central portion 112 on two sides, and the two flanges of an end portion, be it 114 or 116, on the other two sides, such that the bending moment is carried into the corner in one pair of flanges, and out of the corner in the other pair of flanges. Each of end portions 114, 116 may be angled upwardly and outwardly on an angle corresponding to the angle of the AAR underframe clearance profile for AAR plate C (or plate F, which is the same). That is, unlike a membrane-style gondola tub, the underfloor cross-bearers 102 are designed to transmit, or to be capable of transmitting, a bending moment.

The beam defined by the cross-bearer may be of a T-section, or a closed hollow section, or a channel welded to the floor section. Each cross-bearer 102 may have the form of a channel welded toes-in to the floor panel, each toe being identified as a web 124, and the back of the channel being identified as flange member 128. Each web 124 may abut floor panel 56 directly, and be connected directly thereto by such means as welding, thereby forming a closed hollow section. Cross-bearer 102 may not have a distinct top or upper flange apart from floor panel 56 such that there is a direct shear flow connection between the upper margins of the webs at which shear is exchanged directly with floor panel 56, rather than, for example, passing into or through an intermediate member.

Figure 3A:
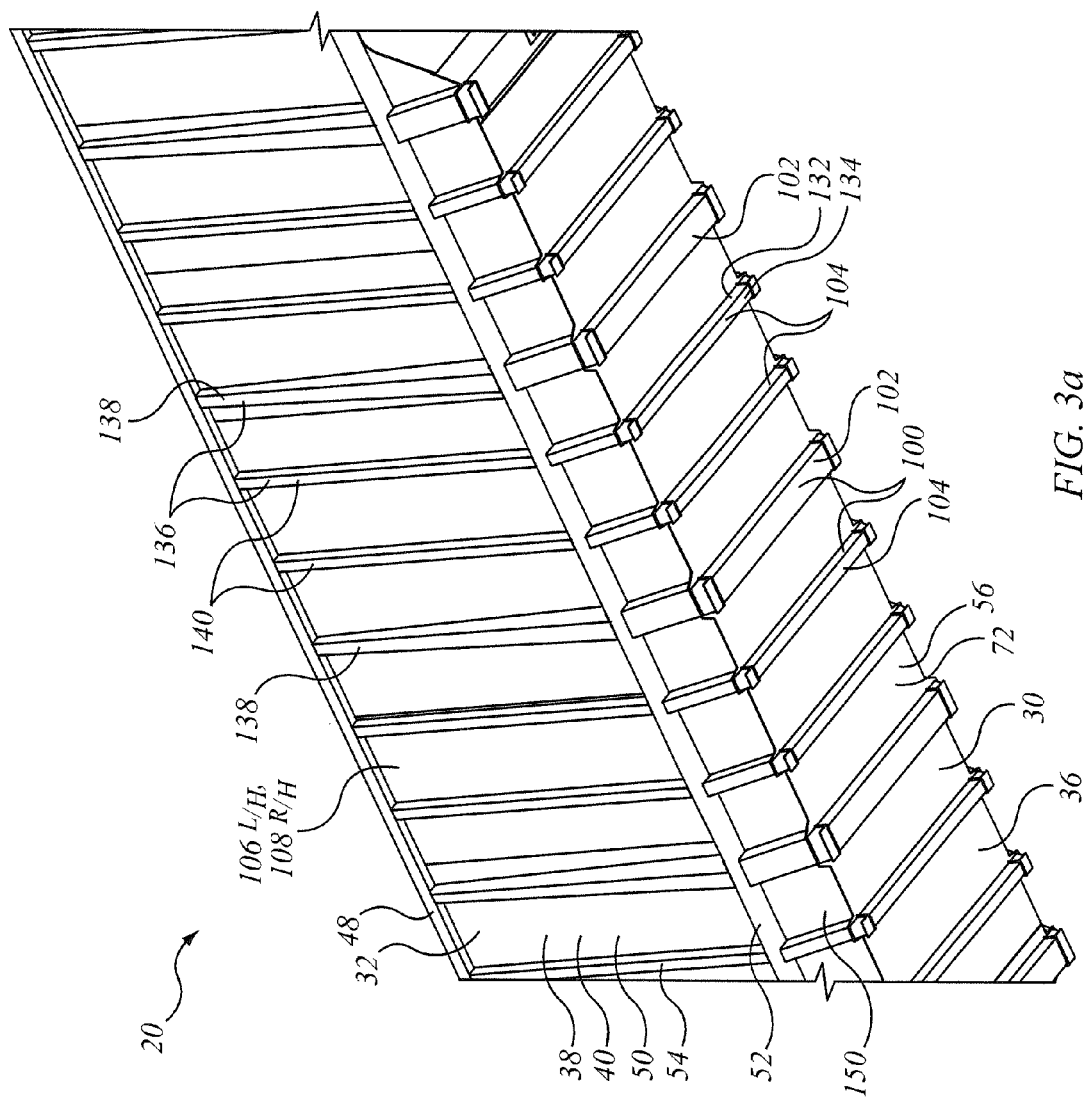

Each cross-tie 104 may have a single web 132, or more than one web 132. Each web 132 extends downwardly from floor panel 56. A bottom flange 134 is welded across, and along, the bottom margins of the web, or webs 132 as may be. As with cross-bearers 102, the web or webs 132 of cross-ties 106 may abut floor panel 56 directly, without the intervention, or addition, of a top flange or cover plate, other than floor panel 56. As such, any shear flow may tend to flow directly from one to the other. In the embodiment of FIG. 1a et seq., the depth of webs 132 may be equal to the depth of webs 124. Floor panel 56 may tend to define the upper flanges of both cross-bearers 102 and cross-ties 104. As discussed above in the context of the top flange of center sill 56, the effective cross-bearer upper flange region 102 of cross-bearer 102 and upper flange region 104 of cross-tie 106 may have an effective width of the order of 40-60 times the thickness of the floor panel sheet, and may for convenience sometimes be taken as being 44-48 times that thickness where there is a single web, and that much plus the web spacing where there are two webs. As shown in FIG. 3a, floor panel 56 may also overlie main bolsters 110. Each main bolster 110 may have an upper flange, web, and lower flange, side bearing fittings and so on. The main bolster meets center sill 80 at the truck centers.

Side Beam Construction

Side beams 106 and 108 are substantially identical in structure, hence a description of side beam 108 may also be taken as a description of side beam 106. Side beam 108 may include top chord 48, and may have a generally upstanding shear membrane or web namely side sheet 50, and side sill 52. Side sheet 50 may have an inboard face or inwardly facing surface oriented toward receptacle 34, and an outbound face, or outwardly facing surface oriented away from receptacle 34. An array of vertical stiffeners 136 may be mounted to web 114 at longitudinally spaced locations along side-beams 106, 108. Vertical stiffeners 136 may be mounted outbound of web 114. Vertical stiffeners 136 may include a first array, or sub array, of stiffeners 138 mounted at locations for structural co-operation with (and typically abreast of) the cross-bearers, and another array, or sub-array, of stiffeners 140 for structural co-operation with (and typically abreast of) the cross-ties 104. There may also be vertical stiffeners abreast of, and for co-operation with, the main bolsters 110.

Top chord 48 may tend to function as the top flange of the side beam 106 (or 108, as may be), and may have a formed cross-section. The cross-section may be that of a structural angle, or it may be that of an I-beam or wide flange beam, or it may be a specialty formed section, such as a bulb angle, or it may be a channel, or it may be a closed hollow section, such as a rectangular or square steel tube 144. Top chord 48 may include one or more doublers along part or all of the upper portions thereof, such as a central, or mid-span portion corresponding to the location of greatest bending moment due to vertical lading loads in the gondola.

At the ends of the car, side sill 52 may lie upon, and be mated with, the laterally outboard margins of end section floor panel portions 68 and 70 which, in those locations define the main horizontal shear panels of car 20, by which longitudinal buff and draft loads are transferred between stub sills 80 and side sills 52 (and hence side beams 106, 108). In the middle, or central, portion of car 20 between the end sections, the webs defined by side wall sheets 50 have depending skirts in the nature of web or sheet extensions 150 that extend downwardly and inwardly of side sills 52 and form the upper or inward closing members, or flanges, of cross-bearers 102 and cross-ties 104. Side sheet extensions 150 may be formed integrally as a single sheet with side sheets 50, and bent, or they may be separate sheets that overlap the inside face of side sill 52 and the lower margin of side sheets 50 and are welded thereto.

In one embodiment, side sheet 52 may be a monolithic steel sheet cut from a single piece of stock and which may run substantially the entire length of car 20 from truck center to truck center or from end bulkhead to end bulkhead. That monolithic steel sheet may have an upper margin mated with top chord 48, typically at a welded lap joint; and a lower margin mated directly with the decking of the car end sections or with the side sheet extensions 150, as may be. The junction at floor panel 56 may be such that floor panel 56 extends somewhat beyond sheet 50, or extensions 150, as may be in the laterally outboard direction by some marginal distance. That is to say, the lower margin of sheet 50, or sheet extension 150, may abut, and be welded to, floor panel 56. This abutment may occur at a T in which floor panel 56 has a laterally outboard margin that may extend laterally proud of sheet 50 or extension 150. Sheet 50 may not necessarily be a monolithic member, but could be made of two or more pieces joined together side-by-side, as by welding. Alternatively, sheet 50 might be connected to supporting members or to longitudinal stiffeners by mechanical fasteners such as Huck™ bolts.

In an alternate or optional feature, the connection between the lower margin of sheet 50 or extension 150 (as may be) and floor 56 may be overlain by a longitudinally running protective shroud member, which may be a chamfered flat bar lying at an angle such as might run a portion or substantially all of the length of the joint, and joined to floor panel 56 by welding, and may serve to protect the welded joint from damage in the instance where the car is unloaded using an hydraulic shovel or other potentially damaging equipment.

It may be that sheet 50 (or extension 150) is a continuous sheet. It may also be that in some embodiments the greater portion of web 114 may be relatively thin, being perhaps less than $3/16$ inches thick, and on some embodiments $1/8$ inch thick or less. In one embodiment the web thickness may be about ⅟₁₀ inch. In one embodiment, a doubler, or base margin plate, is mounted along the bottom edge of the web, either on the inside, or on the outside. The doubler or base margin plate may have a depending margin that is not overlapped by the main portion of the web, and may itself be thicker than the main portion of the web, and may have a thickness comparable to (i.e., within +/−40% of) the thickness of floor sheet 56.

Stiffeners

Vertical stiffener 138 may have a cross-section in a variety of forms, be it and I-beam, a structural section of arbitrary shape, an H.S.S. tube, and so on. In one embodiment, it may include a back 166 and a pair of legs 164 mounted to cooperate with an adjacent opposed region 168 of sheet 50. Back 166 and legs 164 may be an integrally formed pressing, or a pre-fabricated sub-assembly which is then joined to sheet 50. Back 166 may stand spaced from sheet 50, and may be in a parallel plane thereto, which plane may be an x-z plane, with the width of stiffener 138 being in the longitudinal, or x-direction, and the length being in the vertical or z-direction, or generally upward direction toward top chord 48. Legs 164 may connect back 166 to web 134, the distal ends of legs 164 being connected thereto by suitable means, such as welding. A closed hollow section may be developed, such as may define an upwardly running beam for resisting lateral deflection of the webs defined by legs 164 and top chord member 48 of beam 106 (or 108) generally. Stiffener 138 may be of constant section from bottom to top, or may have a tapering section. A tapering section may be broad at its base, near floor panel 56, and narrower at its tip, where it may be connected to top chord 48. Put somewhat differently, stiffener 138 may be such that, in the context of resisting lateral deflection of top chord 48 and sheet 50, the effective second moment of area at the base (including the co-operative effect of the adjoining region of side sheet 50) of stiffener 138 may be greater than at the tip, and may diminish progressively upwardly along the length thereof. The effective width of cooperative adjoining region may be the distance between legs 164 plus an effective distance to either side thereof that is, in total, in the range of 20-30 times the thickness of sheet 50. In one embodiment, this effective distance may be about 24 times that thickness plus the distance once between the webs.

A stiffener extension assembly 148 may be mounted beneath each of stiffeners 138 generally in line with each of cross-bearers 102. Stiffener extension assembly 144 may include a first wall or member 154, a second wall or member 156, and a third wall or member 158. The first, second, and third members may be substantially planar, and may be formed as a single, integrally formed part, such as a section of channel 160, which may be a forged, pressed, roll formed or other structural section cut to length as a stub section. That length may be 6 inches or more. First wall member 154 may be the back of the stub channel 160, and second and third wall members 156, 158 may be the legs of the stub channel 160. Stiffener extension assembly 148 may also include a fourth wall, such as may be identified as a cross-bearer bottom flange extension member 162, which may be welded in place to mate with extension 148 opposite cross-bearer bottom flange member 128, and which may be co-planar with bottom flange member 128. Cross-bearer bottom flange extension member 162 may be welded across the lower end of the stub section of channel 160, to provide a shear flow transfer connection along a line between the lower margins of second and third wall members 156 and 158 and bottom flange extension member 162. The most laterally outboard distal end of bottom flange extension member 162 may adjoin, and connect to, the lowermost distal margin of first wall member 154.

Stiffeners 140 may be mounted along sheet 50 in an alternating manner with stiffeners 138. Each stiffener 140 may include a web member 172 running predominantly up-and-down on sheet 50, and standing predominantly outwardly therefrom, and a flange member 170 running with, and having a shear flow connection with web member 172, the flange member being spaced from sheet 50, and typically standing laterally outboard thereof. In one embodiment, stiffener 140 may have the form of a formed section such as an angle, a hollow tube, which may be rectangular or square, a roll formed, forged, or U-pressing channel in which flange member 166 may be the back of the channel, and web member 172 may be either of two legs of the channel whose toes are welded to sheet 50.

The upper end of stiffener 140 may be welded to top chord member 48. As with stiffener 138 described above, the co-operation of the channel with sheet 50 may tend to yield a hollow structural section that stiffens sheet 50 in the up-and-down direction, perpendicular to top chord 48, and that may tend to discourage buckling of sheet 50. That structural section may tend to have an effective inner flange width equal to the width of the channel between the legs, plus an effective flange width to either side of 40 to 60 (i.e., 20 to 30 times to each side, for a total of 40 to 60 times the thickness of sheet 50 (and which may in some embodiments be taken as roughly 44-48 times that thickness). Similar to cross-bearer 102, cross-tie 104 may have arms or extensions that have the form of structural sections, such as channels, that are welded toes-in to side sheet extension 150.

The Structural Knees

Conceptually, it may be desired for the side posts at the cross-bearer ends to act as springs that may tend to resist lateral deflection of top chord 48, and perhaps of the sidebeam generally, due to the lading, and such other forces as may tend to wish to flex the top chords laterally. To this end the combination of the cross-bearer and the sideposts (with the adjacent portions of the sidewall sheets, sheet extensions, and the floor that act as co-operating flanges thereof) may function like the ribs or frames of a ship, generally defining a large spring, the tips of the spring ending at the top chords In this regard, the lading may be considered as a distributed lateral pressure load, $P_{Lading}$ working against the sidebeams 106, 108, and, more particularly, working against the containment membranes. The containment membranes may, in this context, be the webs, or web sheets 50 (and 150), as well as floor panel 56, and the end wall bulkheads. To this end, it may be desirable for the structural connection between the upstanding sideposts and their associated cross-bearers to be able to transmit a bending moment.

Inasmuch as the loads may be large and cyclic, it may be desirable to avoid sharp stress field discontinuities. The general object then is to transmit a moment couple carried by the sidepost flanges (e.g., 162 and 168) into the flanges of the cross-bearer (e.g., 56 and 128) while trying to avoid unduly sharp variations in the stress fields in the flanges and webs, and while trying to keep the stress fields relatively evenly spread out such that the peak stresses may be closer to the mean stresses than they might perhaps otherwise be.

As this is a multi-dimensional stress field problem, understanding may be aided by considering that a sidepost such as stiffener 138 is to be considered in the generic sense as representing any sidepost, which may have a single web, or in the context where it is understood that side post has a hollow section, such as a roll formed section having a back or flange, and a pair of spaced apart legs. There is an associated cross-bearer 102. It may be that cross-bearer 102 has the same number of webs as the side post or it may not. There is structure identified in association with the sidepost that performs the function of a first flange member (region 168); that performs the function of a second flange member (back 166); and also structure that performs the function of a shear transfer web member (leg 164) joined to and working between the flanges. Region 168 runs vertically and extends in the longitudinal direction, substantially planar in the z-x plane. In extension 150 this need not necessarily be so. The plane of extension 150 could be inclined with respect to the vertical, as illustrated, or might not necessarily be a plane at all, but could be a curve. Similarly, the other spaced-away flange member (back 162) may tend to be planar, and may lie in a parallel x-z plane but, generically, it need not necessarily be planar, and need not be parallel, but could in one embodiment be at an inclined angle. The second flange member may tend to run, and to carry tensile or compressive stresses, in the generally up-and-down direction of the flange generally. The web members' legs (164) are also intended to define a generic shear coupling between the flange members, and need not be planar. However, the web member, or members, may be generally planar, and may lie in a plane that is perpendicular to the flange members, such as a laterally outboard extending, vertically running, y-z plane.

The web member(s) carry the lateral load due to the lading working against the sidewall, and the flange members carry the accumulated bending moment associated with lateral load. Since the lateral load $P_{Lading}$ is a distributed load working in the positive y-direction (i.e., laterally outboard) it is assumed that the inboard flange carries a tensile stress field, and the outboard flange carries a compressive stress field, the two stress fields, $\sigma_{t\text{-}Post}$ and $\sigma_{c\text{-}Post}$, being such that, when integrated and taken over their moment arms, define a moment couple, $M_{Lading}$ having a generally clockwise sense when viewed looking into the page. Ideally, these stress fields would have a roughly uniform stress distributed across the flanges and the moment couple would be roughly the product of that stress multiplied by the areas of the flanges, multiplied by the square of the moment arm, it being conservatively assumed that the share of the moment carried by the webs can be ignored as small. In this explanation, the inboard flange may be a flange of a formed post, or may be a portion of the side sheet web (e.g., sheet 50 or 150) of the side beam of the rail road car more generally, where the effective width of the flange relative to the intersecting web is a function of side beam web sheet thickness, for example.

Similarly, there is structure identified in association with cross-bearer 102 that performs the function of a first, or upper, flange member; structure that performs the function of a second flange member, which may be a bottom or lower flange member such as member 128; and also structure that performs the function of a shear transfer web member (webs 124, 126) joined to and working between the flange members. That is, it may be substantially planar in the x-y plane, with a width perpendicular to the page, and a major dimension, or length, along which tensile $\sigma_{t\text{-}Floor}$ or compressive $\sigma_{c\text{-}Floor}$ stresses due to the moment couple $M_{Reaction}$ may be carried, that major dimension being substantially parallel to the y axis laterally inboard of elbow 118 or 120. This need not necessarily be so. The plane might be inclined, as along extension 150, or might not necessarily be a plane at all, but could be a curve, or have a camber. Similarly, the lowest flange member 128 may tend to be planar, and may lie in a parallel plane to that of the upper (or inner) flange member, but, generically, it need not necessarily be planar, and need not be parallel. Webs 124 and 126 are intended to define a generic shear coupling between the flange members, and need not be planar. However, the web member or members may be generally planar, and may lie in a plane that is perpendicular to the flange members, such as a vertically extending, laterally outboard running, y-z plane.

As above, it may be assumed that each web member provides a shear connection between the flange members and that those flange members carry the bending moment reaction $M_{Reaction}$ to moment $M_{Lading}$. Since $M_{Lading}$ works clockwise in the example, the reactive moment $M_{Reaction}$ must be counter-clockwise, such that it is assumed that the first, or upper flange member carries a tensile stress field $\sigma_{t\text{-}Floor}$, and the second or lower flange member carries a compressive stress field, $\sigma_{c\text{-}Floor}$, the two stress fields, when integrated and taken over their moment arms, defining the reactive moment couple. $M_{Reaction}$ clearing, for static determinacy the sum of $M_{Lading} + M_{Reaction} = 0$, i.e., they are equal and opposite.

Although not necessarily generically essential, and not always possible, it may often be desirable for the various flanges and associated webs to be substantially planar and mutually perpendicular. This may tend to minimize, or to avoid giving rise to, secondary or tertiary out-of-plane forces (and hence also to avoid the need for provision of reaction load paths for those secondary or tertiary out-of-plane loads). These secondary and tertiary out-of-plane forces may not necessarily be considered benign. Where out of plane members are employed, they may sometimes be employed in opposed pairs in which the out-of-plane effects may be equal and opposite, and so may tend to have a balancing effect.

Web portion 118 in the elbow may be considered part of, or an extension of, 124 or 126 of cross-bearer 102, or may be considered part of, or an extension of the web (i.e., leg 164) of the post (stiffener 138). This web portion may be part of either, or an extension of either, or may be a separate member that is not formed as an integral part of either, but is attached to both by fabrication, such as welding. Similarly, web portion 118 may be bounded by stress field transfer members such as an inboard post flange continuity member (e.g., 150), an outboard post flange continuity member (e.g., 154), an upper cross-bearer flange continuity member (e.g., 56), and a lower cross-bearer flange continuity member (e.g., 128). Each of these members may have the form of a substantially planar gusset, or may have another form, such that one edge abuts, or is substantially aligned with, and connected to communicate compressive or tensile forces with, the flange member with which it is associated, and another portion thereof runs along, and is connected to transmit shear forces to, an associated edge of web portion 118.

For the purpose of this explanation with respect to laterally outwardly working forces tending to bend the upstanding posts outboard, the reaction to the vertical lading load is not discussed. The vertical lading load is reacted, primarily, in the side beam, which carries the vertical shear and the associated bending moment to the end sections of the car. The embodiment may share the common feature of flange continuity, and transfer of longitudinal stress fields in the flanges on one side of the knee by shear flow into shear stress fields in one or more webs at the corner of the knee, which are then again transferred into longitudinal stresses in the flanges on the other side of the knee. In these embodiments, the shear flow is encouraged to occur over a line interface, and out-of-plane deflection of the various flanges is discouraged.

Stub Center Sill Transition

Figure 3B:
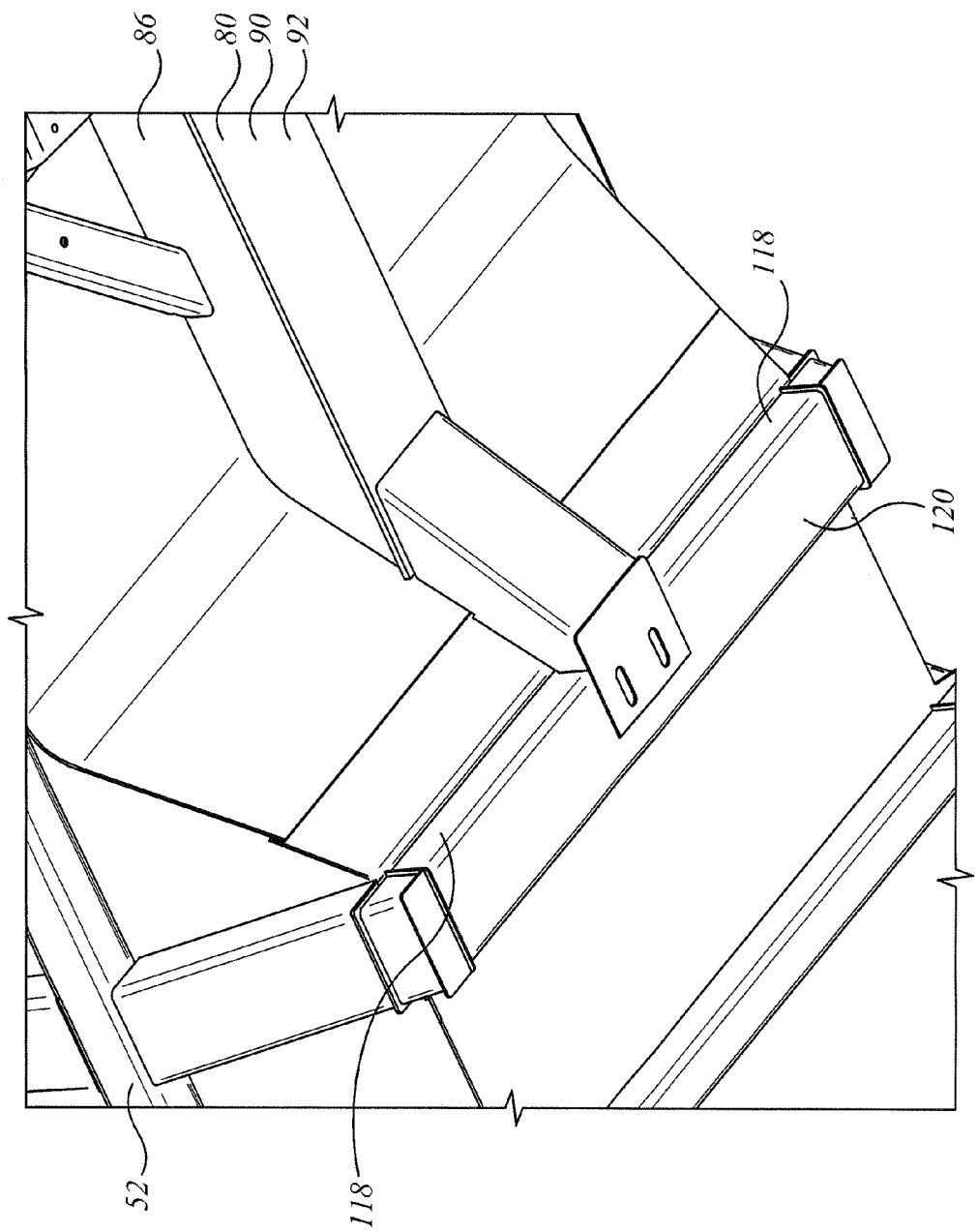
FIG. 3b is an enlarged detail of the isometric view of FIG. 3a showing a transition between a stub center sill and a drop-center cross-bearer.
Figure 3C:
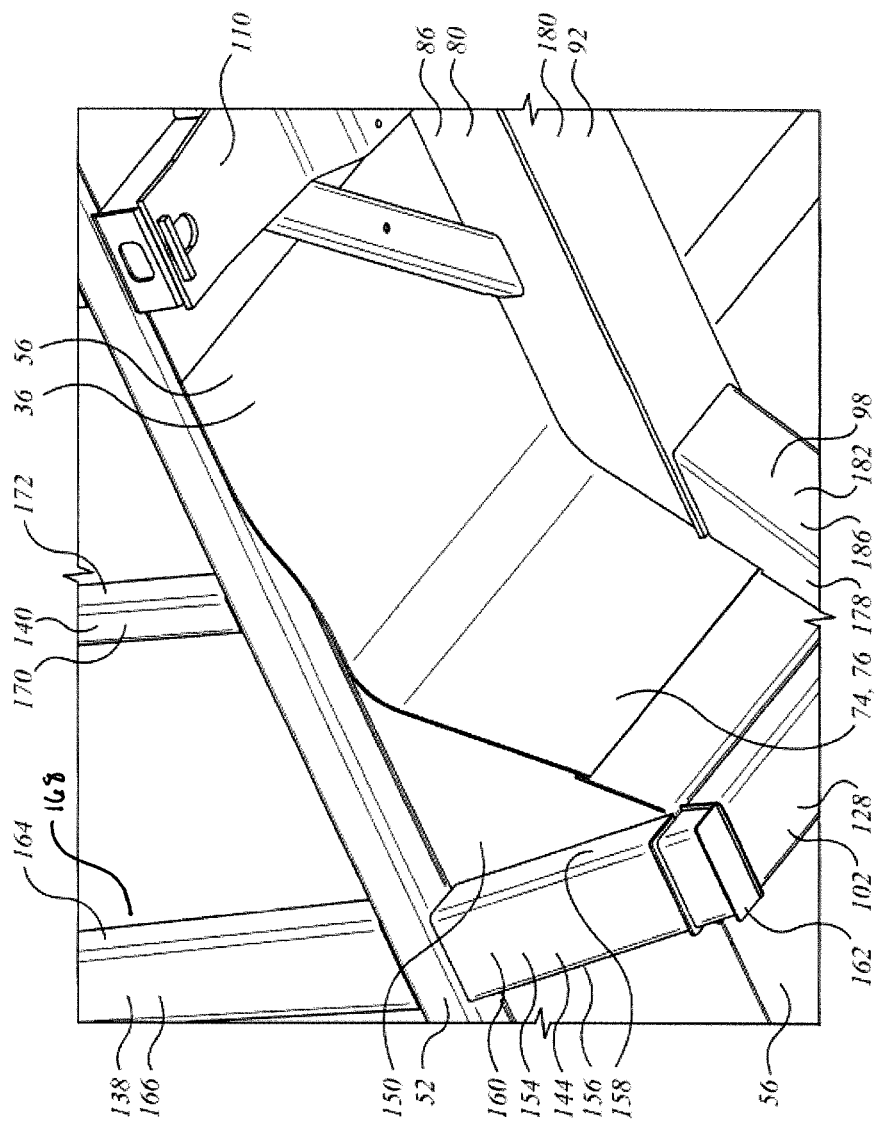
Figure 3D:
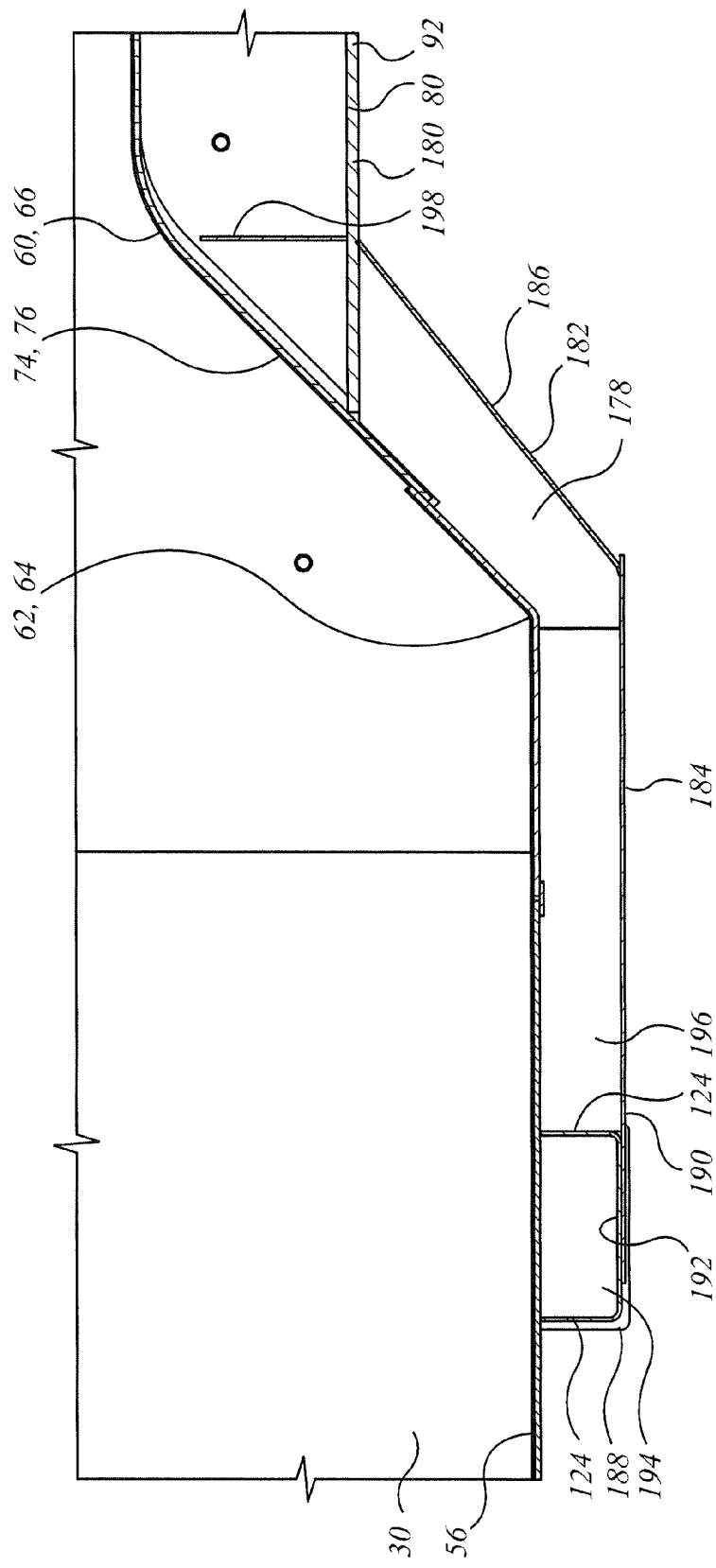
FIG. 3d is an enlarged detail of the cross-section of FIG. 1f.

As may be seen in FIGS. 3*a*, 3*b*, 3 *c* and 3*d*, stub sill 80 has, at its inboard end, a stub sill extension, or gooseneck 98. The main portion of stub sill 80, which runs straight inboard from the truck center, may be identified as 180. Main portion 180 terminates at the interface wall defined by the sloped intermediate bulkhead, be it transition portion 74 or 76. At this location the stub sill side webs may be formed to conform to the downward curve of floor sheet 56. Goose neck 98 is attached to, or extends from, the inboard end of main portion 180 may include a first portion 182 and a second portion 184. First portion 182 may extend generally downward and longitudinally inboard along the slope of the transition portion. Second portion 184 may extend generally horizontally beneath floor 56 to terminate at an inboard end mated to the first structural cross-member, namely cross-bearer, 188. The cross-section of each of the portions of gooseneck 98 may be that of a channel welded toes-in against transition 74 or 76, as may be, and against the underside of floor 56. Second portion 184 may have the same depth of section as cross-bearer 188, and may have a bottom flange 190 that overlaps, and is welded to, back 192 of cross-bearer 188. Cross-bearer 188 has internal gussets 194 providing web continuity with webs 196 of second portion 184. The depth of section of cross-bearer 188 may be less than the depth of section of stub sill 80, such that first portion 182 tapers, as seen in its webs 178. The bottom or outer flange 186 of first portion 182 is spaced away from transition 74 or 76, and mates with bottom flange 190 inboard, and stub sill bottom cover plate 92 outboard. An internal gusset 198 provides web continuity and vertical reaction at the junction of cover plate 92 and flange 190. The co-operation of floor sheet 56, second portion 184 and cross-bearer 188 is such that floor sheet 56 functions as a shear web carrying shear between the side sheet extensions 150 and stub sill 80.

As noted above, side sheet extensions 150 are angled laterally inwardly and downwardly. Floor sheet 56 is trimmed laterally inwardly immediately longitudinally outboard of the transition, such that the laterally outboard edge of transition portion 74 (or 76, as may be) of floor sheet 56 is abutted by, and is welded to, the tapering end margin of side sheet extension 150, forming one corner of a downwardly converging truncated pyramid. Transition portion 74 is effectively a deep laterally extending beam that is inclined on a slope. The tapering mating with the inclined side sheets forms a torsionally stiff box end outboard of cross-bearer 188.

Figure 4A:
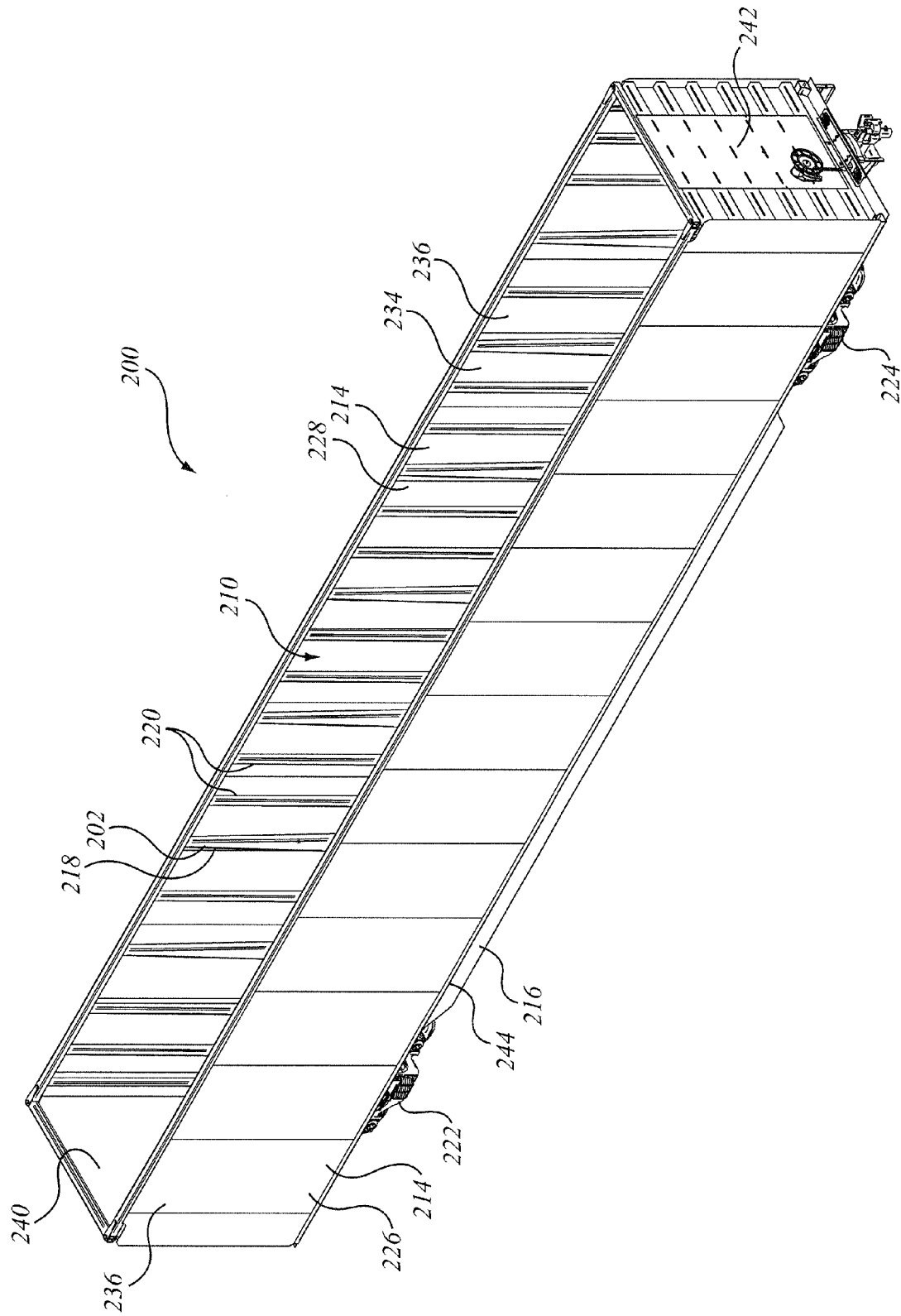
FIG. 4a is an isometric, general arrangement view of another alternate embodiment of railroad freight car to that of FIG. 1a having internal structural members.
Figure 4B:
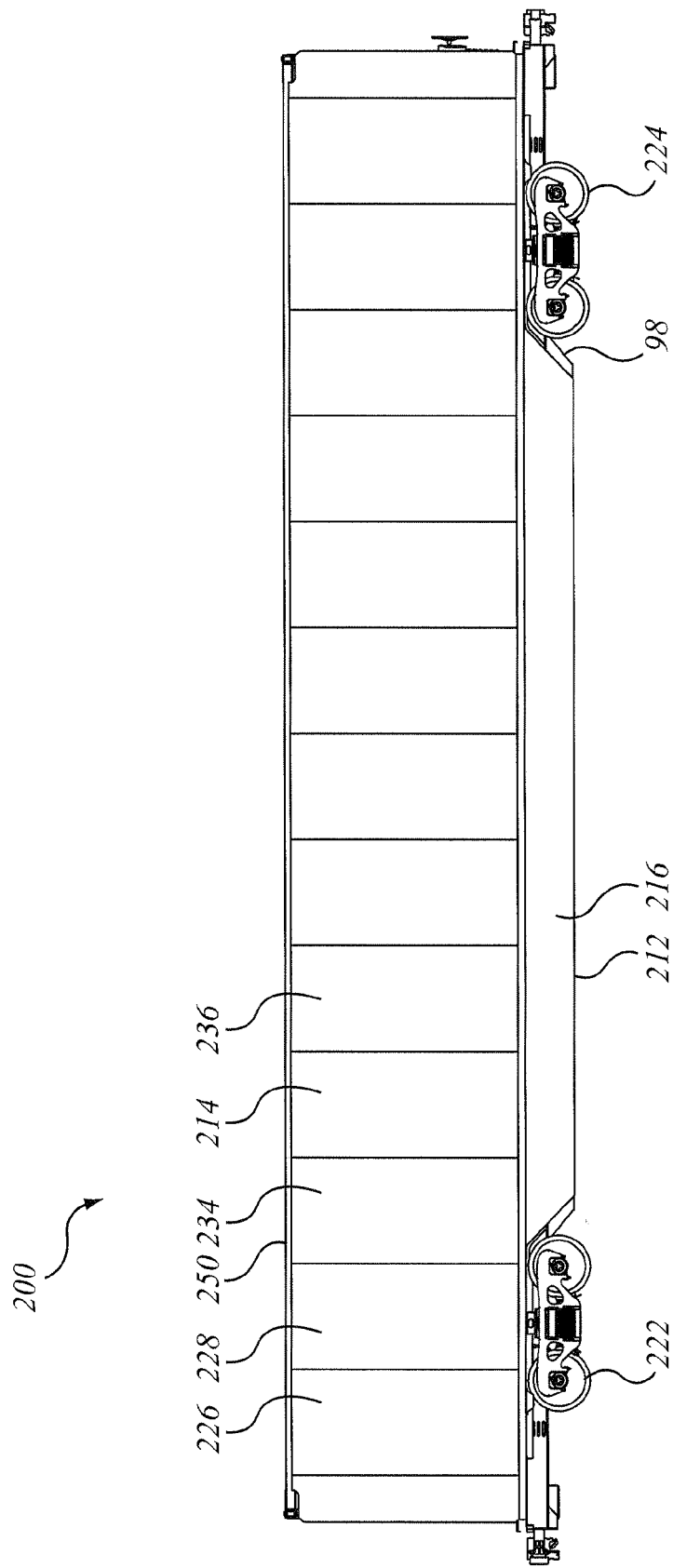
Figure 4C:
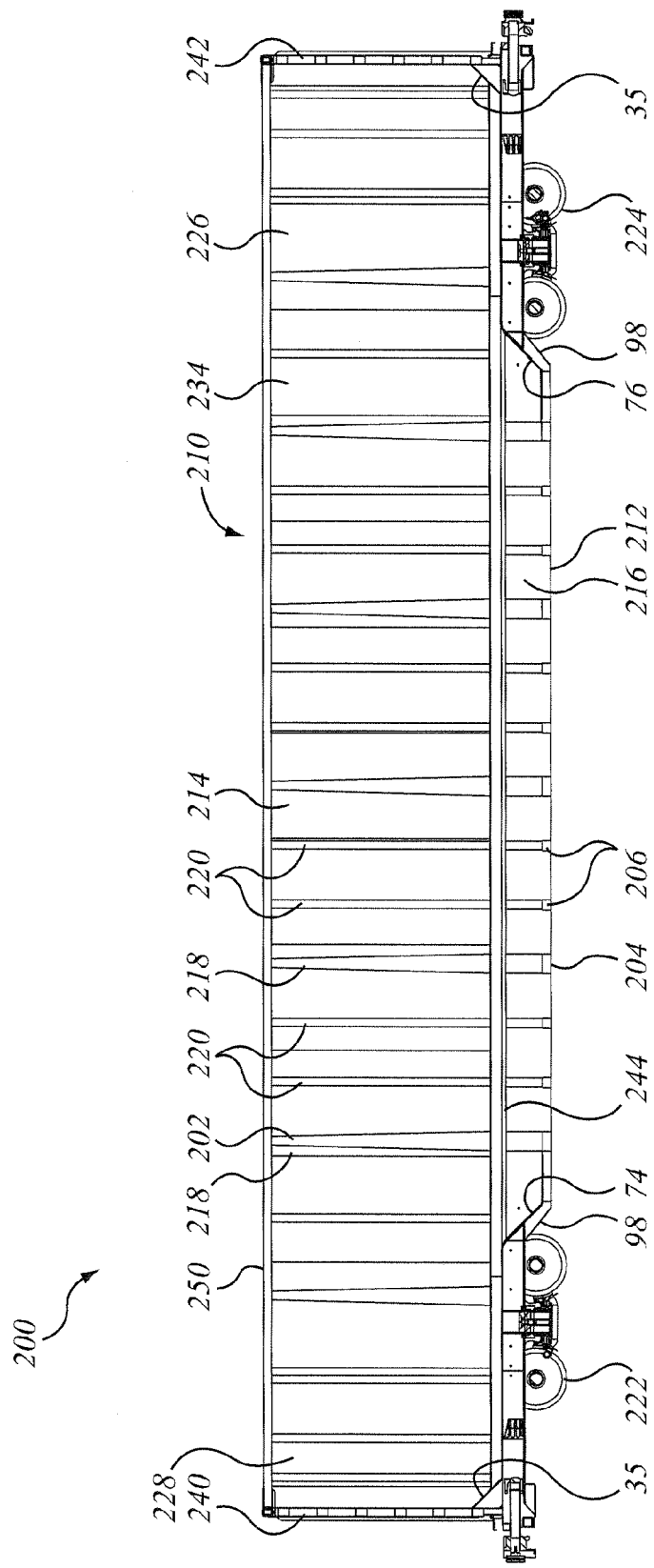
FIG. 4c is longitudinal sectional view, in elevation, along the centerline of the railroad freight car of FIG. 4b.
Figure 4D:
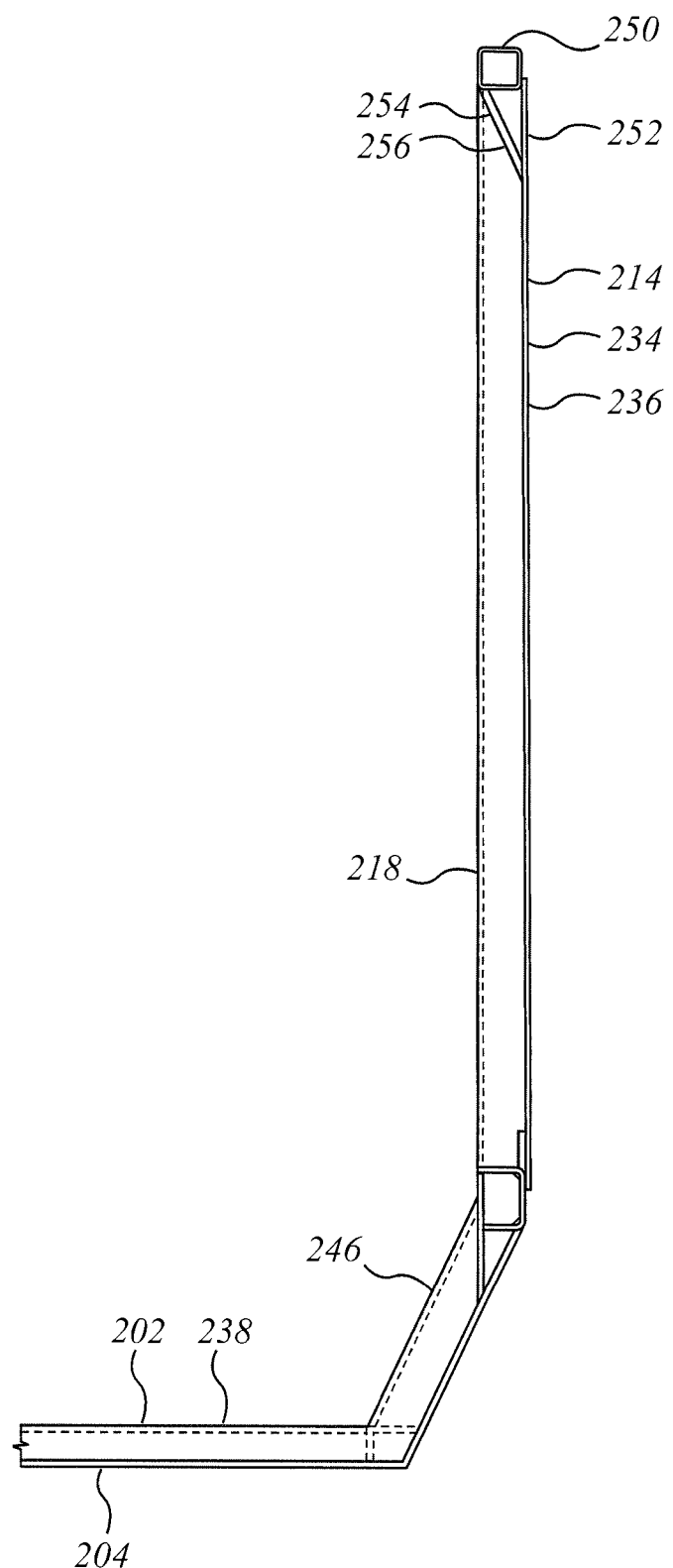
FIG. 4d is a left-hand half cross-sectional view, in elevation, on section '4d-4d' of the railroad freight car of FIG. 4b looking toward a cross-bearer.

Embodiment of FIG. 4a

FIG. 4a shows an isometric view from above and to one corner of an example of a rail road car 200 that is intended to be generically representative of a wide range of rail road cars, and in particular railroad freight cars, in which the present invention may be incorporated. While car 200 may be suitable for many different uses, it may in one embodiment be a gondola car. With the exception of brake fittings, safety appliances and other secondary fittings, car 200 is substantially symmetrical about both its longitudinal and transverse, or lateral, centreline axes. Consequently, where reference is made to a first or left-hand side beam, or first or left-hand bolster, it will be understood that the car has first and second, left and right-hand side beams, bolsters and so on. Railroad car 200 is substantially similar to railroad car 20, but differs therefrom in having its floor and side wall sheets outside of the framing structure rather than inside. That is, if the combination of cross-bearers and side posts in moment-transmitting connection each define, in effect, a skeletal rib or frame in car 20, and each such frame lies outside floor sheet 56 and side sheets 50, such as may facilitate unloading with hydraulic shovels, car 200 may include substantially the same structure, indicated as frame 202. However, frames 202, including cross-bearers 204 and cross-ties 206, lie predominantly or wholly within lading containment receptacle 210. The frames 202 may be made up of sets of cross-bearers 204 and side posts 218; or of sets of cross-ties 206 and side posts 220. Floor sheet 212 is mounted to on the outside, to define the bottom flange of those cross-bearers 204 and cross-ties 206 in the central portion of the car, and side sheets 214 and side sheet extensions 216 are similarly mounted on the outside of the posts 218 and cross-bearers 204 and cross-ties 206, respectively. Rail road car 200 may be a rotary dump car, i.e., one that is emptied by being turned upside-down. A car with outside sheets may have a larger internal volume than one with internal sheets, per unit length of car; and alternatively, may have a slightly lower center of gravity for sidewalls of a given height.

Figure 4E:
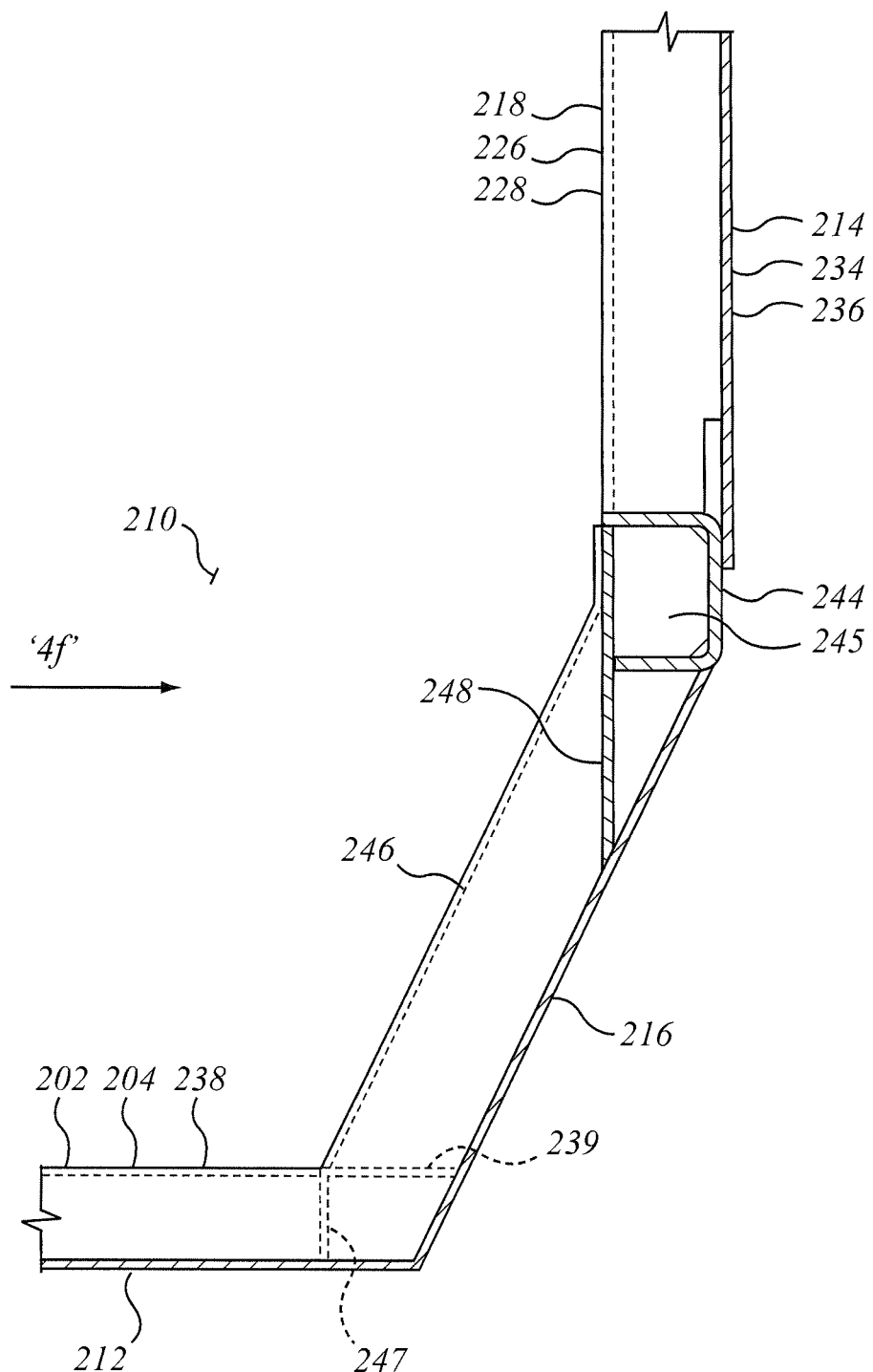
Figure 4F:
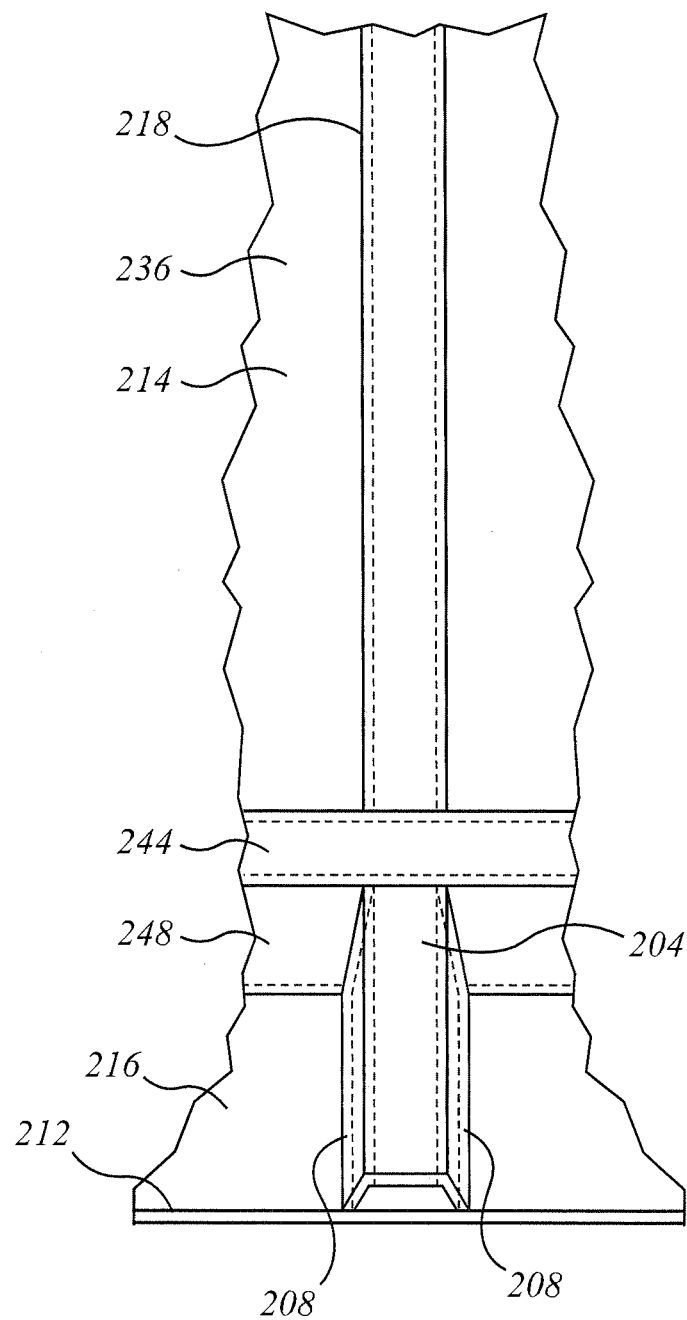
FIG. 4f is a view of the detail of FIG. 4e, looking outboard on arrow '4f'.

Rail road car 200 has a pair of first and second trucks 222, 224, and a rail car body 226 that is carried upon, and supported by, trucks 222, 224 for rolling motion along railroad tracks in the manner of rail road cars generally. Rail car body 226 may include a wall structure 228 defining lading containment receptacle 210. Wall structure 228 may include a base wall, which may be in the nature of a floor or flooring 212, and a generally upstanding peripheral wall 234 which may include a pair of first and second side walls 236, and first and second end walls 240, 242. Flooring 212, sidewalls 236 and first and second end walls 240, 242 may define an open topped box, namely receptacle 210, into which lading may be introduced. Generally speaking, car 200 may be of all steel, or predominantly steel construction, although in some embodiments other materials such as aluminum or engineered polymers or composites may be used for some or a predominant portion of the containment receptacle structure. The car may have left and right hand side sills 244, which may be roll formed to have a "P" shape, as indicated, such that inside leg 248 extends downward to meet side sheet extension 216. Side sill 244 may have internal gussets 245 to provide web continuity between the webs of post 218 (or 220, as may be) and the webs of cross-bearer 204 (or cross-tie 206, as may be). The straight, i.e., predominantly vertical, join of leg 248 with extension 216 may tend to prevent creation of an internal ledge (i.e., on the underside of side sill 244) upon which lading may lodge during emptying. Optionally, as in the alternative embodiment of FIG. 4e, cross-bearers 204 and cross-ties 206 may have vertical webs with square corners in the normal manner of a channel of generally rectangular section, or they may have outwardly inclined, or splayed webs 208, again, the object of the splayed angle being to encourage or facilitate dislodgement of lading when car 200 is being unloaded, as by rotary dumping. The central portion 238 of cross-bearer 204 (and the corresponding central section of each cross-tie 206) lies flat and horizontal on floor sheet 212, while the up-turned end portions 246 lie against the inside face of side sheet extension 216. As above, the members of cross-bearers 204 and cross-ties 206 may be hollow structural sections, such as channels welded with their toes against the floor sheet or side sheet extension, as may be. The back 239 of the channel defining central portion 238 may extend through to side sheet extension 216. An internal gusset 247 may be mounted to provide continuity to the back or flange of the channel forming end portion 246. Similarly, car 200 may have a gooseneck assembly 98 on the inboard end of the stub sill, in which the downward-angled portion of the gooseneck lies outside the transition bulkhead wall, be it 74 or 76, and the horizontal portion runs on top of floor sheet 212 to meet the end-most cross-bearer. The structure of gooseneck 98 is otherwise substantially the same in car 200 as it is in car 20.

It may also be that rather than having one or more laterally extending internal bulkheads or partitions within the body of the wall structure defining receptacle 210 more generally, it may be that a clear space is obtained, free of, or substantially free of, internal lateral partitions or other laterally extending obstructions. For a high aspect ratio car, with relatively tall sides, the resistance of the top chord (and of the associated side beam web) to lateral deflection at the mid-span station may not be overly great, or may not be as great as might otherwise be desirable. To that end, rather than employ a laterally extending bulkhead to tie the top chords laterally, car 200 may employ springs. Those springs may be cantilever springs, such as may be defined by the co-operative effort of cross-bearers 204 and their associated vertical side-posts 218, in which the side-posts are connected to the outboard ends of the cross-bearers at moment connections. Inasmuch as the location of greatest compliance to lateral deflection may tend to be the mid-span location, it may be that the additional spring stiffness may be more concentrated near the central section of the side beam than at the end sections. That is, either in terms of number of springs, or in terms of average spring rate per unit of length of side beam, the auxiliary resistance to lateral resistance of the top chord may be more densely concentrated at the mid-span location than toward the ends of the car. In one embodiment that may mean that two cross-bearers (and their associated moment connected side posts) are placed adjacent to each other without an intermediate cross-tie (with or without an associated side-post). It may mean that more than two cross-bearers (and their associated side-posts) are located side-by-side without intermediate cross-ties. In one embodiment there may be four such cross-bearer and side post sets arranged one beside the other without intervening cross-ties. Those multiple side-by-side cross-bearer and post sets may be located near to the mid-span cross-section of the car, and may be located symmetrically with respect to that cross-section.

In some embodiments, car 200 may be employed to carry materials that may tend to foul or grapple the inside of the car. For example, steel scrap may have sharp edges or protrusions. When the scrap is extracted from the car using an electromagnet, the protrusions may tend to wish to ride up the inside walls of the car body, and may have a tendency to grapple, impact, or tear at, the underside of the top chord. This may not be desirable.

In some embodiments the underside of the top chord may have, or may include, a shedding device which may serve to encourage the deflection of objects around the top chord, or may serve as a protective shield for the top chord. For example, in one embodiment, top chord member 250 may be connected to the upper margin 252 of side sheet 214 at a lap joint. The lap joint may be against the outboard side face of top chord member 250. In addition, the top chord assembly may include a protective shield member, or deflector member, such as may be in the nature of a skirt or fender 254. Fender 254 may be located generally underneath top chord member 250, and may provide a progressively lead-in for objects moving in the vertically upward direction. The lead-in may be sloped or tapered. An example of such a skirt is shed plate 256. Shed plate 256 may be a roll formed member with a long dimension running generally parallel to top chord member 250. Shed plate 256 may run along sheet 214 between vertical stiffener posts 218. Alternatively, shed plate 256 may run continuously, or substantially continuously across the tops of stiffener posts 218. Those posts 218 may be trimmed or chamfered at their upper ends to conform to the profile of shed plate 256. The end of the post may then be welded circumferentially to shed plate 256.

In this arrangement shed plate 256 may have an upper flange portion that may be formed to conform to the inside face of top chord member 250, such that the upper margin of shed plate 256 may lap on the inside face of top chord member 250, and may be welded thereto. The lower, or major, portion of shed plate 256 may extend downwardly and in the outboard direction to meet sheet 214. The lower margin of shed plate 256 may be welded along its length to web 214. The major portion may be substantially planar, and may extend along an angled, or inclined plane.

Various embodiments have been described in detail. Since changes in and or additions to the above-described examples may be made without departing from the nature, spirit or scope of the invention, the invention is not to be limited to those details.

We claim:

1. A rail road gondola car comprising:
a gondola car body carried by railroad car trucks for rolling motion in a lengthwise direction along rail road tracks;
said gondola car body including a drop-center portion located between the trucks;
said drop center portion having a floor structure and a wall structure standing upwardly of said floor structure, said floor structure and said wall structure defining a lading receptacle; and
said drop center portion of said floor structure having at least one cross-wise oriented bending-moment-transmitting frame said frame being mounted outside of said lading receptacle whereby said lading receptacle is free of internal obstructions to unloading.

2. The rail road gondola car of claim 1 wherein said car is a stub sill car.

3. The rail road gondola car of claim 1 wherein said drop center portion of said car is free of a center sill.

4. The rail road gondola car of claim 1 wherein said car has a stub center sill, said stub center sill has an inboard end terminating at said drop-center portion; said inboard end having a goose-neck formed thereat, said gooseneck co-operating with said drop center portion.

5. A drop-center railroad freight car, comprising:
a gondola car body mounted on trucks for rolling motion in a longitudinal direction along railroad tracks;
said gondola car body having first and second end portions and a deeper central portion located longitudinally between said first and second end portions;
said central portion having a floor and at least a first cross-member to which said floor is mounted;
said first cross-member defining a spring;
said spring having a middle portion and first and second ends;
said first and second ends being upturned relative to said central portion.

6. The drop-center rail road freight car of claim 5 wherein said cross-member has the form of an upwardly opening bow member.

7. The drop-center rail road freight car of claim 5 wherein each of said end portions is joined to said central portion at a structural knee.

8. The drop-center rail road freight car of claim 5 wherein said car has first and second stub center sills mounted at said first and second end sections respectively.

9. The drop-center rail road freight car of claim 5 wherein said freight car is free of a straight-through center sill.

10. The drop-center rail road freight car of claim 5 wherein said cross-member is a cross-bearer, said freight car has first and second laterally spaced apart side sills, and said first and second ends of said cross-bearer extend upwardly toward said first and second side sills respectively.

11. A drop-center rail road freight car, comprising:
a gondola car body mounted on trucks for rolling motion in a longitudinal direction along railroad tracks;
said gondola car body having first and second end sections and a deeper central section located longitudinally between said first and second end sections;
said gondola car body being free of a straight-through center sill;
said deeper central section having a floor;
said deeper central section having at least a first cross-bearer to which said floor is mounted; and
upwardly of said first cross-bearer said gondola car body being free of obstructions to unloading.

12. The drop-center rail road freight car of claim 11 wherein said first cross-bearer has the form of an upwardly opening bow member.

13. The drop-center rail road freight car of claim 11 wherein:
said first cross-bearer has a depressed central portion and first and second end portions;
said depressed central portion of said first cross-bearer runs across said floor;
each of said end portions of said cross-bearer extends upwardly from said depressed central portion to a respective side beam of said gondola car body; and
each of said end portions of said first cross-bearer is joined to said central portion of said cross-bearer at a respective structural knee.

14. The drop-center railroad freight car of claim 13 wherein each of said end portions of said first cross-bearer extends upwardly and laterally outwardly from said central portion of said cross-bearer on an incline corresponding to the underframe portion of AAR Plate C.

15. The drop-center rail road freight car of claim 13 wherein said gondola car body has first and second sidewalls running along opposite sides thereof, said first and second sidewalls have upstanding posts and top chords, and said first cross-bearer is aligned with respective posts of said first and second sidewall; and said posts and said first cross-bearer co-operate as a U-shaped spring resistive to lateral deflection of said top chords.

16. The drop center rail road freight car of claim 11 wherein said car has first and second stub center sills mounted at said first and second end sections respectively.

17. The drop-center rail road freight car of claim 11 wherein:
said gondola car body has first and second sidewalls running along opposite sides thereof;
said first and second sidewalls have respective upstanding posts, top chords, and bottom margins distant from said top chords;
said first cross-bearer is aligned with respective ones of said upstanding posts of said first and second sidewalls;
said first cross-bearer has a depressed central portion and first and second end portions;
said depressed central portion of said first cross-bearer runs across said floor;
each of said end portions of said cross-bearer is joined to said central portion;
each of said end portions of said first cross-bearer extends upwardly from said depressed central portion of said first cross-bearer to a mate with a respective bottom end of a respective aligned post of said side beam of said gondola car body; and
said posts and said first cross-bearer co-operate as a U-shaped spring resistive to lateral deflection of said top chords.

18. The drop center rail road freight car of claim 11 wherein said freight car has first and second laterally spaced apart side sills;
said first cross-bearer has a depressed central portion and first and second end portions connected to said depressed central portion; and
said first and second ends of said cross-bearer extend upwardly from said depressed central portion of said cross-bearer upwardly toward said first and second side sills respectively.

19. The drop-center rail road freight car of claim 11 wherein said first and second end sections have first and second stub center sills respectively; and said first stub center sill has a downwardly inclined gooseneck.

20. The railroad freight car of claim 19 wherein said gooseneck of said first stub center sill terminates at an endmost cross-bearer of said central section.

21. The railroad freight car of claim 20 wherein said gooseneck of said first stub center sill meets said endmost cross-bearer at a structural knee.

22. A drop-center rail road gondola car comprising:
a gondola body having first and second end sections and a drop-center middle section therebetween;
said drop center middle section having at least a first cross-bearer, said first cross-bearer having a U-shape.

23. The drop-center rail road gondola car of claim 22 wherein said gondola body has first and second side sills, and said U-shaped cross-bearer has first and second upturned ends connected to said first and second side sills respectively.

24. The drop-center rail road gondola car of claim 22 wherein said first cross-bearer has a low central portion, and first and second upwardly extending end portions connected thereto; said first end portion being connected to said central portion at a first elbow; said second end portion being connected to said central portion at a second elbow.

25. The drop-center rail road gondola car of claim 24 wherein said first and second elbows are structural knees.

26. A drop-center rail road gondola car, comprising:
first and second end sections, and a deeper central section located length-wise between the first and second end sections;
a floor, and a containment wall standing upwardly therefrom, said floor and containment wall defining a receptacle for lading, said containment wall including first and second side walls extending length-wise along opposite sides of the gondola car;
each of said end sections having a main shear web, said main shear web having a substantially horizontal first portion extending cross-wise between said first and second side walls;
said main shear web having a second portion defining a main shear web extension, said second portion extending length-wise inboard and downward of said first portion;
said second portion of said main shear web having margins mated with predominantly downwardly extending margins of said first and second side walls.

27. The drop-center rail road gondola car of claim 26 wherein said first and second side walls have upper portions and lower portions; said lower portions are angled downwardly and cross-wise inwardly; and said lower portions mate with said second portion of said main shear web to define a box end that converges both length-wise and cross-wise.

28. The drop-center rail road gondola car of claim 26 wherein said gondola car has straight through side sills running lengthwise from end section to end section; said first portion of said main shear web mates with said side sills at a lap joint; and said main shear web has a margin that deviates crosswise inboard of said lap joint to mate with said sidewalls downwardly of said side sills.

29. The drop center rail road gondola car of claim 26 wherein said second section of said main shear web defines at least a portion of a sloped intermediate bulkhead between one of said first and second end sections and said central section of said gondola car.

30. The drop center rail road gondola car of claim 26 wherein said gondola car has a stub center sill mated to said main shear web, and said stub center sill has a downwardly and lengthwise inboard extending member mated to said second portion of said main shear web.

31. The drop center rail road gondola car of claim 30 wherein said central portion of said gondola car has an endmost cross-bearer, and said stub center sill includes a member mated to said endmost cross-bearer.

32. The drop center rail road gondola car of claim 30 wherein said first and second sidewalls of said gondola car have respective side sills, top chords and side sheets extending between said top chords and said side sills; said first and second sidewalls have side posts mounted to said side sheets and extending between said side sills and said top chords; and ones of said side posts are in bending-moment transmitting connection with said endmost cross-bearer.

33. The drop-center rail road gondola car of claim 30 wherein said gondola car has a flat floor sheet; said central portion of said first cross-member is mated to said flat floor sheet; and said inboard extending member is downwardly sloped to define at least a portion of a gooseneck; and said gooseneck is connected to said central portion of said first cross-member beneath said flat floor sheet.

\* \* \* \* \*